(12) United States Patent
van Scheltinga et al.

(10) Patent No.: US 11,641,535 B2
(45) Date of Patent: May 2, 2023

(54) CROSS-DEVICE HANDOFFS

(71) Applicant: Google LLC, Mountain View, CA (US)

(72) Inventors: Andrea Terwisscha van Scheltinga, Zurich (CH); Zaheed Sabur, Baar (CH); Michael Reutov, Zug (CH); Pratik Gilda, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/515,837

(22) Filed: Nov. 1, 2021

(65) Prior Publication Data

US 2022/0060804 A1 Feb. 24, 2022

Related U.S. Application Data

(63) Continuation of application No. 16/712,021, filed on Dec. 12, 2019, now Pat. No. 11,166,087, which is a (Continued)

(51) Int. Cl.
*H04Q 3/00* (2006.01)
*H04W 36/00* (2009.01)
(Continued)

(52) U.S. Cl.
CPC .......... *H04Q 3/0033* (2013.01); *G06F 3/167* (2013.01); *G10L 15/22* (2013.01); *H04W 8/205* (2013.01);
(Continued)

(58) Field of Classification Search
CPC ...... H04Q 3/0033; H04Q 2213/13547; H04W 36/0094; H04W 76/025
See application file for complete search history.

(56) References Cited

U.S. PATENT DOCUMENTS 9,363,691 B1 * 6/2016 Shipley ................. H04W 24/04
10,009,666 B1 * 6/2018 Van Scheltinga ........................ H04W 36/0094
(Continued)

FOREIGN PATENT DOCUMENTS

CN 105554283 5/2016
WO 2016054230 4/2016
(Continued)

OTHER PUBLICATIONS

International Search Report and Written Opinion of PCT Ser. No. PCT/US2018/032788, 13 pages dated Aug. 7, 2018.
(Continued)

*Primary Examiner* — Kashif Siddiqui
(74) *Attorney, Agent, or Firm* — Gray Ice Higdon

(57) ABSTRACT

A first computing device may receive an indication of user input that is at least a part of a conversation between a user and a first assistant executing at the first computing device. The first assistant and/or an assistant executing at a digital assistant system may determine whether to handoff the conversation from the first assistant executing at the first computing device to a second assistant executing at a second computing device. In response to determining to handoff the conversation to the second assistant executing at the second computing device, the first assistant and/or the assistant executing at the digital assistant system may send to the second computing device a request to handoff the conversation which includes at least an indication of the conversation.

20 Claims, 5 Drawing Sheets

Related U.S. Application Data continuation of application No. 16/017,718, filed on Jun. 25, 2018, now Pat. No. 10,560,761, which is a continuation of application No. 15/802,568, filed on Nov. 3, 2017, now Pat. No. 10,009,666.

(60) Provisional application No. 62/567,600, filed on Oct. 3, 2017, provisional application No. 62/507,170, filed on May 16, 2017.

(51) Int. Cl.
| | | |
|---|---|---|
| *H04W 76/15* | (2018.01) | |
| *G06F 3/16* | (2006.01) | |
| *G10L 15/22* | (2006.01) | |
| *H04W 8/20* | (2009.01) | |
| *H04W 36/24* | (2009.01) | |
| *H04L 67/50* | (2022.01) | |

(52) U.S. Cl.
CPC ....... *H04W 36/0094* (2013.01); *H04W 76/15* (2018.02); *H04L 67/535* (2022.05); *H04Q 2213/13547* (2013.01); *H04W 36/24* (2013.01)

(56) References Cited

U.S. PATENT DOCUMENTS

| | | | | |
|---|---|---|---|---|
| 10,560,761 | B2* | 2/2020 | Van Scheltinga | ....... G10L 15/22 |
| 11,166,087 | B2 | 11/2021 | van Scheltinga et al. | |
| 2011/0275358 | A1 | 11/2011 | Faenger | |
| 2013/0074125 | A1* | 3/2013 | Hao | ....... H04W 4/203 |
| | | | | 725/62 |
| 2013/0167242 | A1* | 6/2013 | Paliwal | ....... G06F 21/105 |
| | | | | 709/205 |
| 2013/0212212 | A1* | 8/2013 | Addepalli | ....... G06F 9/4856 |
| | | | | 709/217 |
| 2013/0310018 | A1 | 11/2013 | Faenger | |
| 2013/0325967 | A1* | 12/2013 | Parks | ....... H04W 4/80 |
| | | | | 709/204 |
| 2014/0173036 | A1 | 6/2014 | Das | |
| 2014/0244712 | A1* | 8/2014 | Walters | ....... G06Q 30/02 |
| | | | | 709/202 |
| 2014/0245140 | A1* | 8/2014 | Brown | ....... G06Q 30/0601 |
| | | | | 715/708 |
| 2014/0257807 | A1 | 9/2014 | Mauro et al. | |
| 2014/0279889 | A1* | 9/2014 | Luna | ....... G06F 16/27 |
| | | | | 707/626 |
| 2015/0169284 | A1 | 6/2015 | Quast et al. | |
| 2016/0155443 | A1 | 6/2016 | Khan et al. | |
| 2016/0259656 | A1* | 9/2016 | Sumner | ....... G06F 3/167 |
| 2017/0003931 | A1* | 1/2017 | Dvortsov | ....... G11B 27/36 |
| 2020/0120401 | A1 | 4/2020 | van Scheltinga et al. | |

FOREIGN PATENT DOCUMENTS

| | | |
|---|---|---|
| WO | 2016105916 | 6/2016 |
| WO | 20160085776 | 6/2016 |
| WO | 2016067765 | 8/2017 |
| WO | 2018213323 | 11/2018 |
| WO | 2017044257 A1 | 1/2020 |

OTHER PUBLICATIONS

IP Australia; Examination Report issued in Application No. 2018270147 dated Nov. 21, 2019.
Korean Patent Office; Notice of Allowance issued in Application No. 10-2019-7036881; 4 pages; dated May 7, 2021.
Intellectual Property India; Office Action issued in Application No. 201927050217; 7 pages; dated Mar. 18, 2021.
Korean Patent Office; Notice of Office Action issued in Application No. 10-2019-7036881; 11 pages; dated Feb. 26, 2021.
China National Intellectual Property Administration; Notification of Third Office Action issue in Application No. 201880037399.7; 18 pages; dated Jan. 25, 2021.
Japanese Patent Office; Notice of Allowance issue in Application No. 2020177219; 3 pages; dated Jan. 4, 2021.
China National Intellectual Property Administration, Office issued in Application No. 201880037399.7, dated Oct. 28, 2020 (49 pages).
European Patent Office, Examination Report issued in Application No. 18 731 933.0, dated Nov. 27, 2020 (7 pages).
Japanese Patent Office; Notice of Allowance issue in Application No. 2019563377; 3 pages; dated Sep. 23, 2020.
Autralia Patent Office; Examination Report No. 2 issue in Application Serial No. 2018270147; 4 pages; dated Oct. 2, 2020.
Japanese Patent Office; Notice of Reasons for Rejection issue in Application No. 2019563377; 7 pages; dated Jun. 15, 2020.
China National Intellectual Property Administration; Notification of First Office Action issue in Application No. 201880037399.7; 50 pages; dated May 22, 2020.
Japan Patent Office; Notice of Reasons for Rejection issued in Application No. 2021-014971, 9 pages, dated Jan. 31, 2022.
The Korean Intellectual Property Office; Notice of Allowance issued in Application No. 10-2022-7001205; 3 pages; dated Feb. 28, 2022.
Australia Patent Office; Notice of Acceptance for Patent Application issued in Application Serial No. 2020273370; 3 pages; dated Nov. 16, 2021.
European Patent Office; Intention to Grant issued in Application No. 18731933.0, 80 pages, dated Jun. 1, 2022.
Japanese Patent Office; Notice of Reasons for Rejection issued in App. No. 2021-014971, 7 pages, dated Aug. 1, 2022.
Australia Patent Office; Examination Report No. 1 issue in Application Serial No. 2020273370; 3 pages; dated Nov. 1, 2021.
Australia Patent Office; Notice of Acceptance for Patent Application issued in Application Serial No. 202200656; 3 pages; dated Jan. 18, 2023.
Australia Patent Office; Examination Report issued in Application Serial No. 202200656; 5 pages; dated Jan. 6, 2023.
European Patent Office; Communication issued in Application No. 22204814.2; 11 pages; dated Feb. 6, 2023.

* cited by examiner

CROSS-DEVICE HANDOFFS

BACKGROUND

Some computing platforms may provide a user interface from which a user can chat, speak, or otherwise communicate with a virtual, computational assistant (e.g., also referred to as "an intelligent personal assistant," "an interactive assistant," "an assistant module," or simply as an "assistant") to cause the assistant to output information, respond to a user's needs, or otherwise perform certain operations to help the user complete a task. Some assistants may execute on a variety of different computing platforms having different capabilities. For example, some computing platforms may only provide an audio-based user interface for communicating between the user and the assistant while other computing platforms may provide both an audio-based user interface (e.g., microphones and speakers) as well as a visually-based user interface (e.g., a graphical user interface) for communicating between the user and the assistant.

SUMMARY

In general, techniques of this disclosure may enable an assistant to handoff an existing conversation with a user from a first computing platform to a second computing platform, so that the context of the existing conversation that is inferred prior to the handoff is tracked across the handoff. That is, an assistant at the second computing platform that receives a handoff of the conversation may receive a query that refers back to a part of the existing conversation that took place prior to the handoff. The assistant at the second computing platform is able to determine the context of the reference based on the tracked context of the existing conversation inferred by the assistant. The assistant at the second computing device is therefore able to provide a relevant response to the query.

Not only may the assistant handoff an existing conversation, but the assistant may also determine whether to handoff the existing conversation even though the user may not provide an explicit instruction to handoff the conversation. For example, if the first computing platform does not include components that may assist in providing a response to a query (e.g., the first computing platform is not operably coupled to a display device when the query is for navigation instructions to a location), the assistant may handoff the conversation from the first computing platform to the second computing platform where the second computing platform includes such components (e.g., a display to show a map overlaid with navigation directions).

Accordingly, the described techniques may improve usability with an assistant. By determining whether to handoff a conversation (with or without an explicit user command to do so) and determining which other computing system may be well suited to continue the conversation, the user may not need to explicitly instruct the assistant to handoff the conversation from the first computing platform to the second computing platform. Further, rather than simply outputting an error or other message indicating the user should use a different device to complete the query, requiring the user to repeat the query at the second computing platform, the assistant may enable the user to simply continue the conversation at the second computing platform without needing to repeat the same user interactions the user previously provided at the first computing platform. Moreover, the techniques of this disclosure may also increase user comprehension of answers provided by the assistant by identifying other devices that may be better suited to output the answer. In this way, techniques of this disclosure may reduce the number of user inputs required for the user to receive and comprehend an answer, and may reduce the amount of time the assistant is actively executing and processing information at a computing device, thereby reducing the power usage of the computing system on which the assistant executes. In addition, because the techniques of this disclosure reduce the number of times in which a computing device outputs answers in a way that is not well-suited to the computing system, the techniques of this disclosure increase the frequency in which the computing system outputs answers in a way that is well-suited to the computing system, thereby improving the performance and the technical operations of the computing system.

In one aspect, the disclosure is directed to a method. The method may include receiving, by a computing system, an indication of a query received by a first computing device from a user, wherein the query forms at least a part of a conversation between the user and a first assistant executing at the first computing device. The method may further include determining, by the computing system, whether to handoff the conversation from the first assistant executing at the first computing device to a second assistant executing at a second computing device. The method may further include in response to determining to handoff the conversation to the second assistant executing at the second computing device, sending, by the computing system to the second computing device, an indication of the conversation.

In another aspect, the disclosure is directed to a system. The computing may include a first computing device, a second computing device, and a digital assistant system operably connected to the first computing device and the second computing device via a network. The first computing device may be operable to: receive user input indicative of a query that forms at least a part of a conversation between the user and a first assistant executing at the first computing device, and send an indication of the query to the digital assistant system. The digital assistant system may be operable to: receive the indication of the query from the first computing device, determine whether to handoff the conversation from the first assistant executing at the first computing device to a second assistant executing at the second computing device, and in response to determining to handoff the conversation to the second assistant executing at the second computing device, send to the second computing device an indication of the conversation. The second computing device may be operable to: receive, from the digital assistant system, the indication of the conversation, and output a response to the query as part of the conversation.

In another aspect, the disclosure is directed to a computer-readable storage medium encoded with instructions that, when executed, cause at least one processor of a computing system to: receive an indication of a query received by a first computing device from a user, wherein the query forms at least a part of a conversation between the user and a first assistant executing at the first computing device; determine whether to handoff the conversation from the first assistant executing at the first computing device to a second assistant executing at a second computing device; and in response to determining to handoff the conversation to the second assistant executing at the second computing device, send an indication of the conversation to the second computing device.

The details of one or more examples are set forth in the accompanying drawings and the description below. Other features, objects, and advantages of the disclosure will be apparent from the description and drawings, and from the claims.

DETAILED DESCRIPTION

Figure 1:
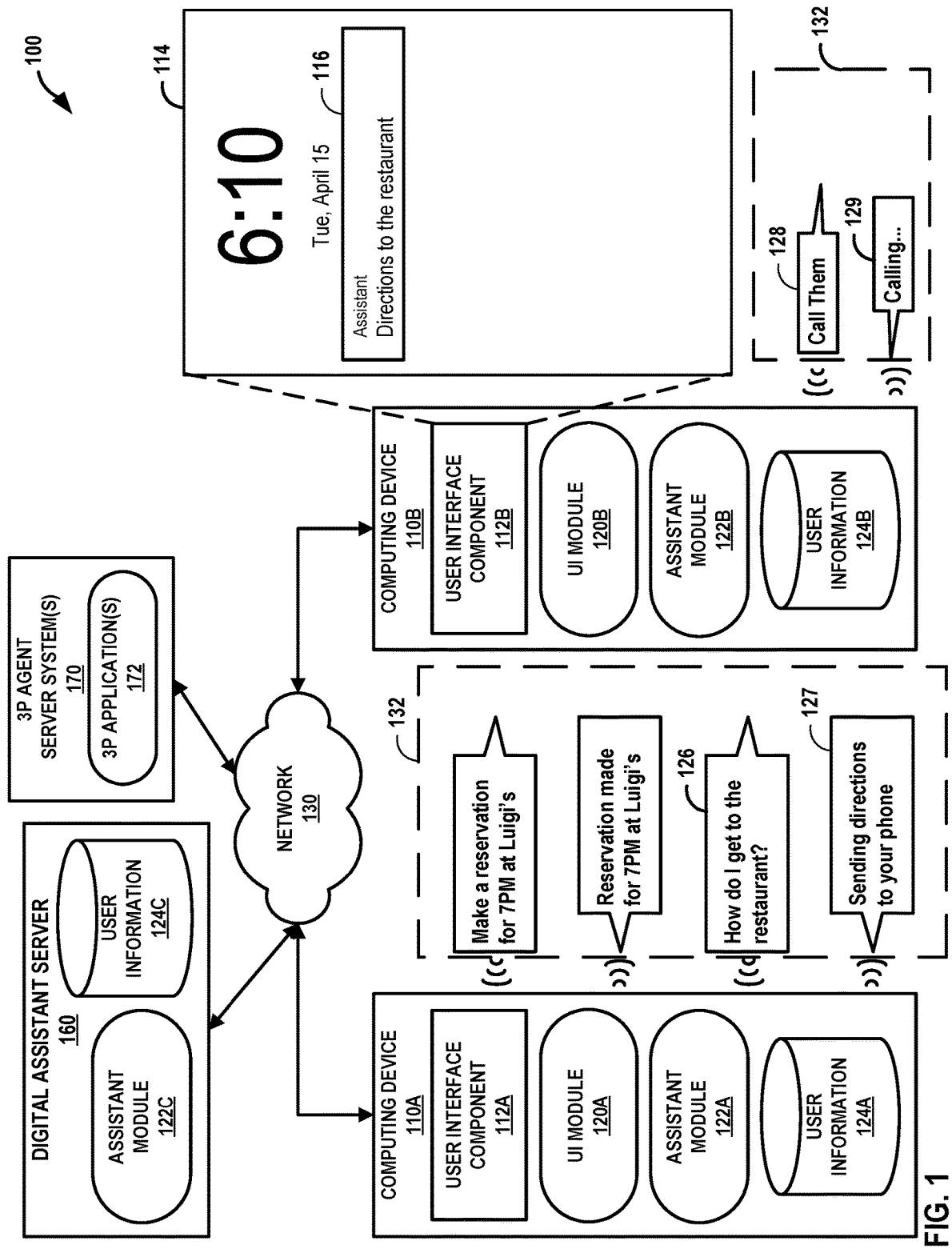
FIG. 1 is a conceptual diagram illustrating an example system that executes one or more example virtual assistants, in accordance with one or more aspects of the present disclosure.

FIG. 1 is a conceptual diagram illustrating an example system that executes one or more example virtual assistants, in accordance with one or more aspects of the present disclosure. System 100 of FIG. 1 includes digital assistant server 160 in communication, via network 130, with computing devices 110A and 110B (collectively, computing devices 110). Although system 100 is shown as being distributed amongst digital assistant server 160 and computing devices 110, in other examples, the features and techniques attributed to system 100 may be performed internally, by local components of computing devices 110. Similarly, digital assistant server 160 may include certain components and perform various techniques that are otherwise attributed in the below description to computing devices 110. Although FIG. 1 illustrates two computing devices 110A and 110B, any suitable number of two or more computing devices 110 may be used.

Computing devices 110 may communicate with digital assistant server 160 via network 130 to access the virtual assistant service provided by digital assistant server 160. Network 130 represents any public or private communications network, for instance, cellular, Wi-Fi, and/or other types of networks, for transmitting data between computing systems, servers, and computing devices. Digital assistant server 160 may exchange data, via network 130, with computing devices 110 to provide a virtual assistant service that is accessible to computing devices 110 when computing devices 110 are connected to network 130.

Network 130 may include one or more network hubs, network switches, network routers, or any other network equipment, that are operatively inter-coupled thereby providing for the exchange of information between digital assistant server 160 and computing devices 110. Computing devices 110 and digital assistant server 160 may transmit and receive data across network 130 using any suitable communication techniques. Computing devices 110 and digital assistant server 160 may each be operatively coupled to network 130 using respective network links. The links coupling computing devices 110 and digital assistant server 160 to network 130 may be Ethernet or other types of network connections and such connections may be wireless and/or wired connections.

Digital assistant server 160 may represent any suitable remote computing system, such as one or more desktop computers, laptop computers, mainframes, servers, cloud computing systems, etc. capable of sending and receiving information both to and from a network, such as network 130. Digital assistant server 160 hosts (or at least provides access to) a virtual assistant service. In some examples, digital assistant server 160 may represent cloud computing systems that provide access to their respective services via a cloud.

Third party (3P) server systems 170 may represent any suitable remote computing system such as one or more desktop computers, laptop computers, mainframes, servers, cloud computing systems, etc. capable of sending and receiving information both to and from a network, such as network 130. In some examples, third party server systems 170 may represent cloud computing systems that provide access to their respective services via a cloud. Third party server systems 170 hosts (or at least provides access to) third party applications 172 that may execute to assist assistant modules 122 in performing various actions. For example, third party applications 172 may include a movie ticket purchasing application, a restaurant reservation application, and the like. Assistant modules 122 may communicate with third party applications 172 to direct them to perform specific actions, such as purchasing a movie ticket or to make a restaurant reservation.

Computing devices 110 represent individual mobile or non-mobile computing devices that are configured to access the virtual assistant service provided via network 130. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

In the example of FIG. 1, digital assistant server 160 includes assistant module 122C and user information data store 124C. Computing device 110A includes user interface component (UIC) 112A, user interface (UI) module 120A, assistant module 122A, and user information data store 124A. Similar to computing device 110A, computing device 110B may include UIC 112B, UI module 120B, assistant module 122B, and user information data store 124B.

Modules 120A, 120B, 122A-122C, and 124A-124C may perform operations described using software, hardware, firmware, or a mixture of hardware, software, and firmware residing in and/or executing at one of computing device 110A, computing device 110B, or digital assistant server 160. Computing device 110A, computing device 110B, and digital assistant server 160 may execute modules 120A, 120B, 122A-122C, and 124A-124C with multiple processors or multiple devices. Computing device 110A, computing device 110B, and digital assistant server 160 may execute modules 120A, 120B, 122A-122C, and 124A-124C as virtual machines executing on underlying hardware. Modules 120A, 120B, 122A-122C, and 124A-124C may also execute as one or more services of an operating system or computing platform, or as one or more executable programs at an application layer of a computing platform.

UIC 112 of computing devices 110 may function as an input and/or output device for computing device 110A. UIC 112 may be implemented using various technologies. For instance, UIC 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UIC 112 may function as input devices using microphone technologies, infrared sensor technologies, or other input device technology for use in receiving user input. For example, UIC 112 may detect, using built-in microphone technology, voice input that UI modules 120 and/or assistant module 122 processes for completing a task. As another example, UIC 112 may include a presence-sensitive display that may receive tactile input from a user of computing devices 110. UIC 112 may receive indications of tactile input by detecting one or more gestures from a user (e.g., the user touching or pointing to one or more locations of UIC 112 with a finger or a stylus pen).

UIC 112 may function as output (e.g., display) device and present output to a user. UIC 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing devices 110. UIC 112 may function as output device using speaker technologies, haptic feedback technologies, or other output device technology for use in outputting information to a user. UIC 112 may present a user interface (e.g., user interface 114) related to a virtual assistant provided by assistant modules 122. UIC 112 may present a user interface related to other features of computing platforms, operating systems, applications, and/or services executing at and/or accessible from computing device 110 (e.g., e-mail, chat, online services, telephone, gaming, etc.).

UIC 112 of computing devices 110 may include the same or different sets of input and/or output devices. For example, UIC 112A of computing device 110A may not include a display device or a presence-sensitive input screen, while UIC 112B of computing device 110B may include a display device and a presence-sensitive input screen. In another example, UIC 112A of computing device 110A and UIC 112B of computing device 110B may both include a display device or a presence-sensitive input screen, but the display device included in UIC 112A may be of a smaller size (smaller viewable area) than UIC 112B.

UI modules 120 may manage user interactions with UIC 112 and other components of computing devices 110 and may interact with digital assistant server 160 to provide assistant services via UIC 112. UI modules 120 and UIC 112 may receive one or more indications of input (e.g., voice input, gesture input, etc.) from a user as the user interacts with the user interface, at different times and when the user and computing devices 110 are at different locations. UI modules 120 and UIC 112 may interpret inputs detected at UIC 112 and may relay information about the inputs detected at UIC 112 to assistant modules 122 and/or one or more other associated platforms, operating systems, applications, and/or services executing at computing devices 110, for example, to cause computing devices 110 to perform functions.

UI modules 120 may cause UIC 112 to output, display, or otherwise present a user interface while a user of computing device 110A views output and/or provides input at UIC 112. For example, as shown in FIG. 1, UI module 120B may send instructions to UIC 112B that cause UIC 112B to display user interface 114 at a display screen of UIC 112B. UI module 120 may also cause UIC 112 to output a user interface in non-visual form, such as audio output. For example, as shown in FIG. 1, UI modules 120 may send instructions to UIC 112 that cause UIC 112 to output audio containing voice output. In the example of FIG. 1, user interface 114 is a graphical user interface. User interface 114 may in some examples be an audible user interface. User interface 114 may include virtual assistant information in various forms such as audible sound, vibrations, text, graphics, content cards, images, etc.

UI module 120 and UIC 112 may receive one or more indications of input (e.g., voice input, touch input, non-touch or presence-sensitive input, video input, audio input, etc.) from a user as the user interacts with user interface 114, at different times and when the user and computing device 110A are at different locations. UI module 120 and UIC 112 may interpret inputs detected at UIC 112 and may relay information about the inputs detected at UIC 112 to assistant module 122A and/or one or more other associated platforms, operating systems, applications, and/or services executing at computing device 110A, for example, to cause computing device 110A to perform functions.

UI module 120 may receive information and instructions from one or more associated platforms, operating systems, applications, and/or services executing at computing device 110A and/or one or more remote computing systems, such as assistant server 160. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A. For example, UI module 120 may cause UIC 112 to output user interface 114 based on data UI module 120 receives via network 130 from digital assistant server 160. UI module 120 may receive, as input from digital assistant server 160 and/or assistant module 122A, information (e.g., audio data, text data, image data, etc.) and instructions for presenting as user interface 114.

Assistant module 122A and assistant module 122C may collaboratively maintain user information data stores 124A and 124C as part of a virtual assistant service accessed via computing device 110A. Similarly, assistant module 122B and assistant module 122C may collaboratively maintain user information data stores 124B and 124C as part of a virtual assistant service accessed via computing device 110B.

After receiving explicit user consent, assistant modules 122 may, e.g., during executing operations to support conversations with a user of computing devices 110, automatically maintain information associated with a user, or pointers to locations of information associated with a user (e.g., stored by information sources located at computing devices 110, digital assistant server 160, or by any other server or device located elsewhere on network 130). Assistant modules 122 may maintain the information, or pointers to information, associated with the user as user information data stores 124. Data stores 124 may enable the assistant executed by assistant modules 122 to quickly access user information required by the assistant to complete a real-world task, a virtual task, or otherwise respond to immediate and/or future needs of the user of computing devices 110.

For example, information associated with a user may be information obtained, with permission from the user, during a conversation between the user and the assistant, calendar information, contact information, user interests, user preferences, and any other information associated with a user that may be used by assistant modules 122 to provide meaningful information to the user. Examples of sources of information associated with the user may include, but are not limited to, the computing devices that are associated with the user, intelligence built in an e-mail system, user interactions with assistant modules 122, user interactions and application usage on devices associated with the user (e.g., computing devices 110), or other sources of information.

The term "conversation" as used throughout this specification refers to regular interactions between a user of a computing device and an assistant executing at or accessible from the computing device as opposed to interactions that might occur during initial set up, installation, first time use, etc. In other words, the conversation occurs during everyday use of the assistant, by the user, as the user is performing a task other than setting up the assistant. Conversation as used herein does not refer to a user answering questions or otherwise interacting with the assistant as part setting up an app or providing information for populating preset fields of a user interface.

In some examples, a conversation may include a series of (e.g., one or more of) queries or requests sent by the user to assistant modules 122 and responses to the queries or requests that are generated by assistant modules 122 and output by UIC 112. Examples of a query or request may include a natural language phrase in the form of a command or a question, such as "search the internet for cute puppy pictures," "show me a list of Academy award winners last year," or "is it going to rain today?" Examples of a response to the query or request may include an output of a list that is presented audibly, such as output of the list of Academy award winners, a natural language phrase, such as "it doesn't look like it's going to rain today," a graphical or video representation of puppies, and the like, that is output by UIC 112 to answer the command or question that forms the query or request.

Assistant module 122C and user information data store 124C represent server-side or cloud implementations of an example assistant whereas assistant modules 122A-122B and user information data stores 124A-124B represent client-side or local implementations of the example assistant. In some examples, some or all the functionality attributed to assistant module 122A may be performed by assistant module 122C. Similarly, in some examples, some or all the functionality attributed to assistant module 122B may be performed by assistant module 122C. In addition, in some examples, some or all of the functionality attributed to assistant module 122C may be performed by assistant modules 122A and 122B.

Assistant modules 122 may each include respective software agents configured to execute as intelligent personal assistants that can perform tasks or services for an individual, such as a user of computing device 110A or computing device 110B. Assistant modules 122 may perform these tasks or services as part of generating a response to a query received from a user. Assistant modules 122 may perform these tasks or services based on user input (e.g., detected at UIC 112A or UIC 112B), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing devices 110 or at digital assistant server 160, obtained via a search service, obtained by third-party applications 172, or obtained by accessing other services or information services via the Internet). Performing a task or service based on spoken user input may be referred to herein as satisfying a user utterance. Assistant modules 122 may perform artificial intelligence and/or machine learning techniques to automatically identify and complete one or more tasks on behalf of a user.

In some examples, assistant modules 122 may perform tasks or services based on spoken user input. One or more microphones of UIC 112 may receive the spoken user input and assistant modules 122 may receive audio data (i.e., from UI module 120A or UI module 120B) generated by the one or more microphones of UIC 112. Assistant modules 122 may selectively process the received audio data to recognize utterances when speech reception is active. Speech reception may be activated in a number of ways. As one example, assistant modules 122 may activate speech reception in response to recognizing a predetermined activation phrase in the received audio data (e.g., "listen assistant"). As another example, UI modules 120 may cause modules 122 to activate speech reception in response to a user pressing a speech reception button on one of computing devices 110.

Assistant modules 122 may satisfy user utterances by performing a task and outputting the result of performing the task as a response to the user utterances that is presented by one or more components of computing devices 110. For instance, assistant modules 122 may cause one or more components of UIC 112 (e.g., displays, speakers, etc.) to produce output (e.g., display video, display graphical user interfaces, emit sound, emit speech output etc.). In some examples, it may be desirable for assistant modules 122 to satisfy some user utterances by causing other computing devices to present output. For instance, if another computing device is more well-suited to satisfy a user utterance, it may be desirable for assistant modules 122 to present output via the other computing device.

In accordance with one or more techniques of this disclosure, in response to computing device 110A receiving user input indicative of a query from a user, system 100 may perform one or more tasks to satisfy the query, and may determine whether a response that is the result of performing the one or more tasks in response to the query is to be output by the same computing device 110A that received the query, or by a computing device of system 100 other than the same computing device 110A that received the request, such as computing device 110B. Such a determination may be made by assistant module 122A executing at computing device 110A, assistant module 122C executing at digital assistant server 160, or a combination of assistant module 122A executing at computing device 110A and assistant module 122C executing at digital assistant server 160.

The query received by computing device 110A from the user, as well as previous queries received by computing device 110A from the user and previous responses to the queries outputted by computing device 110A, forms at least a part of a conversation between the user that issued the query and assistant module 122A executing at computing device 110A. Even though assistant module 122A may communicate or otherwise interact with assistant module 122C executing at digital assistant server 160 to determine responses to queries, such queries received by computing device 110A and corresponding responses output by computing device 110A are considered to form a conversation between the user and assistant module 122A executing at computing device 110A.

If assistant module 122A and/or assistant module 122C determines that a computing device other than the same computing device 110A that received the query, such as computing device 110B assistant module 122A and/or assistant module 122C is handing off the conversation between the user and assistant module 122A executing at computing device 110A to computing device 110B. In response, assistant module 122A and/or assistant module 122C may perform the handoff so that the response to the query received by assistant module 122A is output by computing device 110B via 112B. By handing off the conversation to computing device 110B, computing device 110B is able to receive additional queries and generate, via assistant modules 122B and/or 122C, responses to those queries to continue the conversation.

Handing off the conversation may include making available information regarding the conversation, such as semantic intent, contextual information, and the like of the conversation prior to the handoff, to assistant modules 122B and/or 122C, so that assistant modules 122B and/or 122C may use such information in formulating responses to queries received by computing device 110B. In this way, assistant modules 122B and/or 122C is able to generate relevant responses to queries received by computing device 110B even when these queries refer back to portions of the conversation that took place at computing device 110A.

Computing device 110A may receive user input (e.g., voice input, textual input, or any other suitable form of user input) that includes a query from the user. Assistant module 122A at computing device 110A may, in response to receiving the query from the user, determine a response to the query that satisfies the user's request, as well as the form in which to present the response. For example, if the received request comprises a request for directions to a location, assistant module 122A may determine that the response to the request be the requested directions, and that such directions be presented in the form of an interactive map that is displayed by a display device. Assistant module 122A may determine whether computing device 110A is capable of visually presenting the directions as an interactive map, such as by determining whether computing device 110A is operably coupled to a display device, or whether computing device 110A includes interactive mapping software that can present the directions as an interactive map. If assistant module 122A determines that computing device 110A is not capable of visually presenting the directions as an interactive map, assistant module 122A may determine if the user is associated with another computing device (e.g., a smartphone) that includes or is operably coupled to a display device. If assistant module 122A determines that the user is associated with computing device 110B that includes a display device, assistant module 122A may handoff the request to assistant module 122B at computing device 110B, and computing device 110B may output the directions in the form of a map for display by a display device.

In the example of FIG. 1, computing device 110A may receive, via UIC 112A, user input in the form of voice input that includes query 126. In other words, computing device 110A may receive, via one or more audio input devices (e.g., microphones), speech uttered by the user, such as "how do I get to the restaurant?" In general, a query to computing device 110A may be a user interaction (e.g., user input) with computing device 110A that requests assistant module 122A and/or computing device 110A to perform one or more actions or tasks in response to the request.

In response to receiving the query, assistant module 122A executing at computing device 110C and/or assistant module 122C executing at digital assistant server 160 may perform one or more tasks and determine a response to the query. In some examples, assistant module 122A may determine the response to the query without sending an indication of the query to digital assistant server 160. If computing device 110A receives user input in the form of voice input, assistant module 122A may be able to process the query by analyzing the voice input to recognize utterances, determine the semantic intent of the query, and the like, in order to formulate a response to the query.

In some examples, assistant module 122A may utilize assistant module 122C executing at digital assistant server 160 to process the query. Computing device 110A may send at least an indication of the query to digital assistant server 160 so that assistant module 122C executing at digital assistant server 160 may process the query to recognize utterances, determine the semantic intent of the query, and the like. In the example where the request is in the form of voice input, such an indication of the request may be an audio recording or a speech-to-text transcription of the request. In other examples where the request is in the form of textual input (e.g., via a keyboard), such an indication of the request from the user may be the text inputted by the user. Along with the indication of the query, assistant module 122A may also send additional information to digital assistant server 160, such as an indication of the identity of computing device 110A, an indication of the user that issued the query, and the like, so that digital assistant server 160 may send an indication of the result of analyzing the query back to the proper computing device.

Digital assistant server 160 may send an indication of the result of analyzing the query back to computing device 110A. For example, digital assistant server 160 may send to computing device 110A an indication of the recognized utterances, an indication of the semantic intent of the query, and the like. In response to receiving the indication of the result of analyzing the query from digital assistant server 160, assistant module 122A may formulate a response to the query based at least in part on the indication of the result of analyzing the query.

In some examples, digital assistant server 160 may determine the response to the query received by computing device 110A with or without assistant module 122A. Computing device 110A may send at least an indication of the request to digital assistant server 160 so that assistant module 122C executing at digital assistant server 160 may process the query to recognize utterances, determine the semantic intent of the query, determine the task to be performed in response to the query, and the like. In the example where the request is in the form of voice input, such an indication of the request may be an audio recording or a speech-to-text transcription of the request. In other examples where the request is in the form of textual input (e.g., via a keyboard), such an indication of the request from the user may be the text inputted by the user. In response to processing the query, assistant module 122C may formulate a response to the query based at least in part on its analysis of the query.

As shown above, assistant module 122A by itself, assistant module 122C by itself, or a combination of assistant modules 122A and 122C may determine a response to the query received by assistant module 122A. Therefore, while the disclosure may describe actions as being performed by assistant module 122A, it should be understood that these actions can equally be performed by assistant module 122C or a combination of assistant modules 122A and 122C. It should be further understood that actions described herein as being performed by assistant module 122A and/or assistant module 122C may equally include actions performed solely by assistant module 122A, solely by assistant module 122C, a combination of assistant modules 122A and 122C, in conjunction with third party applications 172 or other internet services, and the like.

As part of determining a response to a query received by assistant module 122A, and determining whether to handoff the conversation to another assistant module, assistant module 122A and/or assistant module 122C may be able to track a conversation to determine the context of words and phrases used in the conversation between the user and assistant module 122A, or otherwise determine contextual information related to or otherwise associated with the conversation by associating meanings with various interactions between the user and assistant module 122A. For example, assistant module 122A and/or assistant module 122C may associate various parts of the conversation, such as words and phrases in the queries and/or responses making up the conversation, with concepts and categories such as place, date, time, location, event, people, and store such associations in user information data store 124A and/or user information data store 124C. Assistant module 122A and/or assistant module 122C may determine such contextual information, including the context of words and phrases used in the conversation and determining associations between parts of the conversation with categories by techniques such as machine learning, deep learning, and the like. In this way, assistant module 122A and/or assistant module 122C may determine the semantic intent of various words and phrases used by the user, or other user input, with reference to previous parts of the conversation, in order to generate responses that are relevant to received queries.

In some examples, assistant module 122C may determine such contextual information related to the conversation and store such contextual information at user information data store 124C. In some other examples, assistant module 122A may determine such contextual information related to the conversation and store such contextual information at user information data store 124A. In cases where such contextual information is stored at user information data store 124A, assistant module 122A may send the contextual information to assistant module 122C for storage at user information data store 124C or to assistant module 122D for storage at user information data store 124B as part of handing over the conversation to computing device 110B or another computing device.

In the example of FIG. 1, the user requests, in conversation 132 with assistant module 122A, that assistant module 122A make dinner reservations for 7 PM at an Italian restaurant named Luigi's. In response to the query, assistant module 122A and/or 122C may interact with a restaurant reservation service of third party applications 172 to make the requested reservation, and assistant module 122A may output, via UIC 112A, a confirmation that it had made the requested reservation for 7 PM at Luigi's. Assistant module 122A and/or 122C may also associate dinner reservations with an event, Luigi's with a restaurant as well as a location, and 7 PM with a time, and store such associations as part of the contextual information associated with conversation 132 into user information data store 124A and/or user information data store 124C. Thus, if the user subsequently interacts with assistant module 122A and issues queries containing words such as "reservation," "dinner," "restaurant," and the like, assistant module 122A and/or assistant module 122C may determine that those words refer to the dinner reservation made for 7 PM at Luigi's based on the stored contextual information, because assistant module 122A and/or assistant module 122C has tracked conversation 132 and determined that in the context of conversation 132, these words refer to the reservation at 7 PM at the restaurant Luigi's.

When assistant module 122A receives query 126 "how do I get to the restaurant," assistant module 122A and/or assistant module 122C may be able to determine the meaning of query 126 based on such contextual information determined from conversation 132, and may determine that the phrase "the restaurant" in query 126 refers to the Italian restaurant "Luigi's" that was previously referenced in conversation 132. By being able to associate the phrase "the restaurant" in query 126 with a specific restaurant (e.g., "Luigi's"), assistant module 122A may determine a relevant response for query 126 to be directions from the user's current location to the location of the Italian restaurant "Luigi's." For example, assistant module 122A may determine that query 126 is a request for directions to Luigi's, and may formulate a response that includes directions to Luigi's.

Regardless of whether it is assistant module 122A, assistant module 122C, or a combination of assistant modules 122A and 122C that determines the response to a query, one or both of assistant module 122A and/or assistant module 122C may also determine whether to handoff the conversation between the user and assistant module 122A to another assistant module (e.g., assistant module 122B) executing at another computing device (e.g., computing device 110B). The one or more assistant modules 122 that determine whether to handoff the conversation may be the same or different one or more assistant modules 122 that determines the responses to queries in the conversation between the user and assistant module 122A executing at computing device 110A.

If assistant module 122A and/or assistant module 122C hands off the conversation, then assistant module 122A and/or assistant module 122C may direct a computing device other than the computing device 110A that received the query from the user to output the response to the query. Handing off a conversation between the user and assistant module 122A to another assistant executing at another computing device may enable the computing device that receives the handoff to output a response to a query received by assistant module 122A executing at computing device 110A, as well as to pick up the thread of the conversation between the user and assistant module 122A, so that it is able to generate relevant responses to queries that refer to portions of the conversation that took place between the user and assistant module 122A.

When a conversation between a user and assistant module 122A executing at computing device 110A is handed off to computing device 110B, the conversation is handed off to assistant module 122B executing at computing device 110B, so that the user may continue the conversation with assistant module 122B executing at computing device 110B in place of assistant module 122A executing at computing device 110A. Thus, the user may continue the conversation with assistant module 122B by sending queries to assistant module 122B via UIC 112B, such as via a microphone, keyboard, or other input devices of computing device 110A, and assistant module 122B may determine responses to the queries and output the responses via UIC 112B, such as via a display device, speakers, and the like.

In addition, as discussed above, when a conversation between a user and assistant module 122A executing at computing device 110A is handed off to computing device 110B, system 100 may preserve the thread of the conversation handed off to computing device 110B. In other words, when a user issues queries to assistant module 122B executing at computing device 110B that refer back to portions of the conversation that took place between the user and user and assistant module 122A executing at computing device 110A prior to handoff, assistant module 122B may be able to infer the intent and meaning of such a reference to determine relevant responses to such queries. In particular, assistant module 122B may utilize the contextual information associated with the conversation that is determined by assistant module 122A and/or assistant module 122C during the user's conversation with assistant module 122A to connect the user's query with concepts, elements, places, times, events, and the like that were previously referenced during portions of the conversation that took place between the user and user and assistant module 122A executing at computing device 110A.

In some examples, assistant module 122A and/or assistant module 122C may receive, as part of a query, explicit instructions (e.g., from the user) to handoff a conversation to another computing device. For example, had query 126 stated "send directions to the restaurant to my phone," assistant modules 122A and/or 122C may determine the phone associated with the user to which the user is referring, based on information stored in user information data stores 124 of computing device 110A and/or digital assistant server 160, or information regarding computing devices associated with the user that is stored and/or accessible via the cloud. If assistant module 122A determines that computing device 110B is a smartphone associated with the same user, and that computing device 110B is available to receive the handoff of the conversation, then assistant module 122A and/or assistant module 122C may, in response, follow the user's explicit instructions and may handoff conversation 132 to computing device 110B.

In some examples, assistant module 122A and/or assistant module 122C may determine whether to handoff the conversation based on pre-defined preferences. Pre-defined preferences may be preferences that were previously defined by the user regarding the devices to which assistant module 122A may handoff a conversation based at least in part on response that is to be generated. For example, the user may pre-define a preference that all music be played by a smart home theater system associated with the user, or that all photos be output by a digital media device (e.g., a television set top box) associated with the user to a television set connected to the digital media device. Thus, if assistant module 122A determines that the response to the query is the playing of a song, assistant module 122A may handoff conversation to the smart home theater system as defined by the user if the smart home theater system is available to receive the handoff, even if the user is associated with many different devices (e.g., a smartphone) that each have the ability to play music.

In some examples, assistant module 122A and/or assistant module 122C may determine whether to handoff conversation to another computing device without receiving explicit instructions from the user, and without previously defined preferences. Assistant module 122A and/or assistant module 122C may determine whether to handoff the conversation between the user and assistant module 122A to another computing device, as well as select the computing device to which the conversation is handed off, based on a variety of factors, such as the query, the response to the query, contextual information associated with the user (e.g., the user's activity), computing devices associated with the user, availability of computing devices, and the like. Assistant module 122A and/or assistant module 122C may only handoff a conversation to a computing device that is available to receive the handoff.

A computing device may not be available to receive a handoff if the computing device is not powered on, is not authorized to receive the handoff, or is not associated with the user. In some examples, a computing device is associated with the user if the user is logged into the computing device, if the user is logged into a virtual assistant service (e.g., digital assistant server 160), and/or if the user is otherwise authorized to access the computing device (e.g., provide user input to the computing device and receive output from the computing device).

Assistant module 122A and/or assistant module 122C may determine whether to handoff a conversation to another computing device based at least in part on the functional capabilities and/or features of computing devices associated with the user (e.g., computing devices 110A and 110B). A functional capability may be a difference in hardware, software or other functionality. Different computing devices may have different functional capabilities, features, and characteristics. Such functional capabilities may include whether the computing device includes or is operably coupled to a display device, the size of such a display device, the type of the computing device (e.g., if the computing device is a mobile phone, if the computing device is a wearable device, if the computing device is a TV set top box, and the like), the location of the computing device (e.g., the location of computing device with respect to computing device 110A), and/or any other suitable factors.

For example, a standalone virtual assistant or a smart speaker system may not include a display device, while a smartphone includes a display device. An infotainment system of an automotive vehicle may include a display device, but may not be capable of outputting a response until the vehicle has been unlocked or has started. A wearable device such as a smartwatch may include a display device, but such a display device may be physically much smaller than the display device included in a smartphone. In addition, a wearable device and a smartphone are portable devices that is likely carried by or be near the user at almost all times, while a standalone virtual assistant may typically be a stationary device that is usable only by users in the same room or location. Meanwhile, an infotainment system of an automotive vehicle may typically be used only while the user is in the automotive vehicle. Assistant module 122A and/or assistant module 122C may consider these and any other suitable functional capabilities, features, and/or characteristics when determining whether to handoff a conversation and determining the computing device to which the conversation is handed off.

Assistant module 122A and/or assistant module 122C may determine the form in which to present a response (e.g., audibly, visually, as a list, as a map, as a video, and the like), and determine whether one of the computing devices associated with the user is available to receive the handoff and is able to present the response in the determined form based at least in part on the functional capabilities of the computing devices associated with the user. Assistant module 122A and/or assistant module 122C may determine if UIC 112A of computing device 110A is capable of presenting the response in the determined form. If UIC 112A of computing device 110A is capable of presenting the response in the determined form, assistant module 122A and/or assistant module 122C may refrain from handing off the conversation and may, instead, output the response via UIC 112A of computing device 110A. If assistant module 122A and/or assistant module 122C determine that UIC 112A of computing device 110A is not capable of presenting the response in the determined form, then assistant module 122A and/or assistant module 122C may determine if another one of the available computing devices associated with the user is capable of presenting the response in the determined form. If another computing device associated with the user (e.g., computing device 110B) is capable of presenting the response in the determined form, assistant module 122A and/or assistant module 122C may handoff the conversation to the other computing device.

For example, if assistant module 122A and/or assistant module 122C determine that a response be presented visually (e.g., displayed at a display device), then assistant module 122A and/or assistant module 122C may determine whether UIC 112A is operably coupled to a display device. If so, assistant module 122A and/or assistant module 122C may refrain from handing off the conversation, and may direct UI module 120A to cause UIC 112A to visually present the response. On the other hand, if assistant modules 122A and/or 112C determines that UIC 112A does not include a display device, and is therefore not capable of presenting the response in the determined form, assistant module 122A and/or assistant module 122C may determine if another computing device associated with the user (e.g., computing device 110B) is operably coupled to a display device and, if so, may handoff the conversation to the other computing device so that the other computing device outputs the video as the response.

Assistant module 122A and/or assistant module 122C may determine the one or more computing devices that are associated with the user that issued the query, as well as the features, capabilities, and/or characteristics of the one or more one or more computing devices that are associated with the user in any suitable fashion. For example, assistant module 122A and/or assistant module 122C may access information associated with the user stored in user information data store 124A, user information data store 124C, or elsewhere (e.g., the cloud), which may specify the computing devices that are signed on to or otherwise associated with a user account of the user, as well as the features, capabilities, and/or characteristics of these one or more one or more computing devices. In other examples, the computing devices associated with the user may communicate an indication of its capabilities to assistant module 122A and/or assistant module 122C, so that assistant module 122A and/or assistant module 122C may determine whether computing device 110A Assistant module 122A and/or assistant module 122C may also determine whether computing device 110A should handoff a conversation or refrain from handing off the conversation to another computing device based at least in part on trust. If assistant module 122A and/or assistant module 122C cannot confirm that a potential target device for receiving the handoff is associated with the user and/or authorized by the user, then assistant module 122A and/or assistant module 122C may refrain from handing off the conversation to the potential target device. One form of trust may be registration of a device with assistant module 122A and/or assistant module 122C. If the potential target device is not registered with assistant module 122A and/or assistant module 122C, then assistant module 122A and/or assistant module 122C may be unable to confirm that the potential target device is authorized to receive the handoff of the conversation. Another form of trust is the user being logged into the potential target device, or the user being logged onto the virtual assistant service via the potential target device. Thus, if the user is not logged into the potential target device, then assistant module 122A and/or assistant module 122C may be unable to confirm that the potential target device is authorized to receive the handoff of the conversation. In some examples, some conversations may be explicitly marked or indicated as not able to be handed off to another device. If assistant module 122A and/or assistant module 122C determines that the conversation is so marked, assistant module 122A and/or assistant module 122C may refrain from handing off the conversation to a potential target device.

In some examples, two or more computing devices associated with the user may be capable of outputting the response in the form determined by assistant module 122A and/or assistant module 122C. For example, two or more computing devices associated with the user may be capable of visually outputting a response. In these cases, assistant module 122A and/or assistant module 122C may be able to select, based on a variety of factors, a computing device out of the two or more computing devices associated with the user that are capable of outputting the response in the determined form. For example, assistant module 122A and/or assistant module 122C may make such a selection based on the relative sizes of the display devices operably coupled to the two or more computing devices, the location of the two or more computing devices, and/or any other suitable factors. For example, if computing device 110A is a smartwatch, and if computing device 110B is a smartphone, assistant module 122A and/or assistant module 122C may determine the size of the response (e.g., the size of an image to be presented, the size of a website to be presented, and the like). If the size of the response is relatively large, and if computing device 110B is operably coupled to a display device having a relatively larger viewing area than the display device operably coupled to computing device 110A, assistant module 122A and/or assistant module 122C may decide to handoff the conversation to computing device 110B.

In another example, assistant module 122A may select the computing device to handoff a conversation further based at least in part on determining the activity being performed by the user, or potential activity to be performed by the user. For example, if assistant module 122A and/or assistant module 122C determines that a response to a received request are directions to a location, and if the user is detected as entering his car, having entered his car, or about to enter his car, assistant module 122A may handoff the conversation to an assistant executing at the user's car's infotainment system, so that the infotainment system may display directions to the location. For example, if the user is carrying his phone as he enters his car, his phone may establish a connection (e.g., Bluetooth connection) with the car. When such a connection is established, the smartphone and/or infotainment system may report such a connection to digital assistant server 160. In response, digital assistant server 160 may communicate the directions to the location to the smartphone and/or infotainment system, or may direct one of the third party server systems 170 to communicate the directions to the location to computing device 110B. In this way, computing device 110A may determine to handoff the conversation based on a user's current activity or potential future activity.

In another example, assistant module 122A and/or assistant module 122C may select the computing device to handoff the conversation based on determining the locations of one or more other computing devices associated with the user. assistant module 122A and/or assistant module 122C determines that a response is to be presented visually (e.g., displayed at a display device), and if UIC 112A does not include a display device, assistant module 122A and/or assistant module 122C may determine one or more computing devices associated with the user that is capable of visually resenting the response (e.g., includes or is operably coupled to a display device). However, the user may be associated with more than one computing device that is capable of visually resenting the response. For example, the user may be associated with one or more TV set top boxes, computers, tablets, smartphones, and the like that are all capable of visually resenting the response.

Another way to select the computing device to which the conversation is handed off may be based at least in part on the proximity of the computing device to computing device 110A. For example, if two or more computing devices are available to receive handoff of the conversation and are capable of presenting the response, assistant module 122A and/or assistant module 122C may handoff the conversation to the computing device associated with the user that is physically nearest to computing device 110A out of the computing devices associated with the user that are capable of presenting the response in the desired form. Assistant module 122A and/or assistant module 122C may determine the physical proximity of the computing devices associated with the user in many ways. For example, assistant module 122A and/or assistant module 122C may query the computing devices for their current location. Assistant module 122A may also try to direct connect, via short-range communications (e.g., Bluetooth, ultrasonic communications, infrared, and the like) with computing devices associated with the user that are physically proximate to computing device 110A. Because users are relatively more likely to access computing devices that are proximate to him or herself, and because the user is likely to be physically proximate to computing device 110A in order to issue a query to computing device 110A, assistant module 122A and/or assistant module 122C may prevent handing off the conversation to a computing device that the user is unlikely to access in the near future by handing off the conversation to a computing device that is physically proximate to computing device 110A.

In another example, assistant module 122A and/or assistant module 122C may determine the computing device to which the conversation is handed off based at least in part on recent activity. For example, if two computing devices both have the same or similar functional capabilities in order to output the response in a desired form (e.g., visually), assistant module 122A and/or assistant module 122 may select the computing device that is most recently active (e.g., most recently used by the user) as the computing device to which the conversation is handed off.

In some examples, third party applications 172 that execute in conjunction with assistant module 122A and/or assistant module 122C may cause the handoff of the conversation to another computing device, or may otherwise instruct assistant module 122A and/or assistant module 122B to handoff a conversation to another computing device (e.g., computing device 110B). Third party applications 172 may be applications or services with which assistant module 122A and/or assistant module 122C interacts in order to perform a requested task or to otherwise generate a response to the query. Assistant module 122A and/or assistant module 122C may provide an application programming interface (API) that third party applications 172 may access in order to interact with assistant module 122A and/or assistant module 122C.

For example, assistant module 122A and/or assistant module 122C may interact with a third-party movie ticket purchasing application executing at third party server systems 170 during the course of a conversation in which the user requests that the assistant module 122A purchase movie tickets. In response to receiving such a request, assistant module 122A and/or assistant module 122C may communicate with the third-party movie ticket purchasing application to direct the application to purchase movie tickets. In response, the third-party movie purchasing application may proactively send a request to assistant module 122A and/or assistant module 122C to handoff the conversation to another computing device (e.g., computing device 110B) that includes or is operably coupled to a display device, so that the other computing device may output a visual representation of the seating chart for the movie, thereby allowing a user to see and select available seats for the movie. In response to receiving the request, assistant module 122A and/or assistant module 122C may hand off the conversation to a computing device that is operably coupled to a display device.

In some examples, assistant module 122A and/or assistant module 122C may determine the form of the response based at least in part on the functional capabilities of the computing devices associated with the user. More specifically, assistant module 122A and/or assistant module 122C may determine the form of the response that will be suitable for at least one of the computing devices of the user. For example, if computing device 110A receives a query for today's weather, assistant module 122A and/or assistant module 122C may determine the form in which to present the weather forecast. If none of the computing devices associated with the user who issued the query is operably coupled to a display device, assistant module 122A and/or assistant module 122C may refrain from determining to output a visual representation of the weather forecast. Instead, if at least one of the computing devices associated with the user is operably coupled to an audio output device (e.g., speakers), assistant module 122A and/or assistant module 122C may determine to output an audio representation of the weather forecast.

In the example of FIG. 1, because query 126 is a request for directions, assistant module 122A and/or assistant module 122C may determine that the response to query 126 be in the form of an interactive map. Assistant module 122A and/or assistant module 122C may determine whether computing device 110A is capable of presenting an interactive map of the directions to the restaurant.

For example, computing device 110A may send an indication of its functional capabilities, or its identity, to digital assistant server 160 so that assistant module 122C may utilize such information to determine whether computing device 110A is operably coupled to a display device that is capable of presenting an interactive map of the directions to the restaurant. Alternatively, digital assistant server 160 may have already stored information regarding the capabilities of computing device 110A, which assistant module 122C may utilize to determine whether computing device 110A is operably coupled to a display device that is capable of presenting an interactive map of the directions to the restaurant. If assistant module 122A makes the determination of whether computing device 110A is operably coupled to a display device that is capable of presenting an interactive map of the directions to the restaurant, computing device 110A may not need to send information about itself to digital assistant server 160.

Assistant module 122A and/or assistant module 122C may determine that computing device 110A is not capable of presenting an interactive map of the directions to the restaurant. For example, computing device 110A may be a standalone assistant device that is not operably coupled to a display device. Thus, presenting an interactive map of the directions to the restaurant may determine whether any other computing devices associated with the user are available to receive handoff of conversation 132 and are capable of presenting an interactive map of the directions to the restaurant.

Assistant module 122A and/or assistant module 122C may determine may determine the computing devices that are associated with the user as well as whether these computing devices are available to receive the handoff of the conversation in a number of ways. For example, user information data store 124A and/or user information data store 124B may store a list of computing devices associated with the user as well as their functional capabilities and/or availability status. Alternatively, assistant module 122A and/or assistant module 122C may "ping" computing devices associated with the user (e.g., briefly communicate with those computing devices via network 130) to determine their availability status and/or their functional capabilities. Assistant module 122A and/or assistant module 122C may also determine other relevant information in similar fashion, such as the proximity of the computing devices associated with the user to computing device 110A, the most recently active computing device out of the computing devices associated with the user, as well as other information that may be used to select the computing device that is to receive the handoff, as discussed above.

Based on any or all of the determinations described above, assistant module 122A and/or assistant module 122C may determine that it will handoff conversation 132 to a smartphone associated with the user because the smartphone is capable of presenting an interactive map of the directions to the restaurant and because the smartphone is likely to be carried by the user into his vehicle and used for driving directions. Assistant module 122A and/or assistant module 122C may determine that computing device 110B is a smartphone associated with the user, and may handoff conversation 132 to assistant module 122B executing at computing device 110B.

In some examples, assistant module 122A and/or assistant module 122C may proactively determine whether to handoff a conversation. In other words, such a determination can be made without receiving a query that causes assistant module 122A and/or assistant module 122C. Instead, assistant module 122A and/or assistant module 122C may determine, based at least in part on the conversation that's taken place so far between the user and assistant module 122A, whether to handoff the conversation to another computing device.

In the example of FIG. 1, after the user requests that assistant module 122A make a reservation at the restaurant Luigi's, and assistant module 122A makes the requested reservation as part of conversation 132, and prior to query 126, assistant module 122A and/or assistant module 122C may determine whether to handoff conversation 132 to another computing device. For example, assistant module 122A and/or assistant module 122C may proactively determine whether to handoff conversation 132 to another computing device based at least in part on determining an action that is likely to be taken in the near future by the user based on the contents of conversation 132.

Determining an action that is likely to be taken in the near future by the user based on the contents of conversation 132 may include determining another computing device that the user is likely to interact with in the near future, as well as information that is likely to be useful to the user when the user interacts with the other computing device. Assistant module 122A and/or assistant module 122C may determine the action that is likely to be taken in the near future by the user based on the contents of conversation 132 in many ways, such as based on analyzing user preferences or user history stored at user information data store 124A and/or user information data store 124C. Assistant module 122A and/or assistant module 122C may compare the contents of conversation 132 with previous conversations between the user and assistant module 122A, and may determine previous user actions taken by the user after conversing with assistant 122A. In this way, assistant module 122A may proactively determine whether to handoff conversation 132 as well as determining the computing device to which conversation 132 is to be handed off.

In the example of FIG. 1, assistant module 122A and/or assistant module 122C may determine that because conversation 132 contains indications of the user requesting a reservation to the restaurant Luigi's as well as a confirmation that assistant module 122A and/or assistant module 122C has made the reservation, the user is likely to take his or her smartphone and use the smartphone to navigate to the restaurant. Thus, assistant module 122A and/or assistant module 122C may determine that conversation 132 be handed off to the user's smartphone (e.g., computing device 110B).

Assistant module 122A of computing device 110A from which the conversation is being handed off may output an indication that the conversation is to be handed off to another computing device. In FIG. 1, upon determining that conversation 132 is to be handed off to another computing device, assistant module 122A may inform the user that it has handed off conversation 132 to another computing device by outputting, via UIC 112A message 127 that identifies the computing device to which assistant module 122A has handed off conversation 132, and further indicates that the identified computing device will output the response to query 126.

To hand off the conversation (e.g., conversation 132) from assistant module 122A to assistant module 122B, assistant module 122A and/or assistant module 122C may send to assistant module 122B a request to receive handoff of the conversation, and assistant module 122B may determine whether to receive the handoff of the conversation. If assistant module determines that it will receive the handoff of the conversation, assistant module 122B may send to, assistant module 122A and/or assistant module 122C an indication that it accepts the handoff of the conversation. In response, assistant module 122A and/or assistant module 122C may send an indication of the conversation that has been handed off to assistant module 122B.

In some examples, the indication of the conversation may include at least a portion of the conversation in textual form, in the form of a hash, or in any other suitable form. Such a portion of the conversation may be a log of user interaction with computing device, including all or at least some of the content of input received by computing device 110A (e.g., via UIC 112A) from the user, as well as the content output by computing device 110B during the course of the conversation.

In some examples, the indication of the conversation may also include at least a portion of the contextual information associated with the conversation to the computing device that is receiving the handoff. For example, assistant module 122A and/or assistant module 122C may transfer at least a portion of the contextual information stored in user information data store 124A and/or user information data store 124C to computing device 110B for storage in user information data store 124B. Thus, when the user interacts with assistant module 122B at computing device 110B to continue the conversation, assistant module 122B may use such contextual information to interpret additional queries it receives (e.g., infer meanings from the query) based on previous user interactions with assistant module 122A at computing device 110A, so that it may receive to generate relevant responses to such queries. In this way, the user may seamlessly continue the conversation by interacting with assistant module 122B at computing device 110B without losing the thread of previous interactions with assistant module 122A as part of the conversation.

The indication of the conversation may also include an indication of a response to be outputted by computing device 110B in response to the query. In one example, such an indication of an action to be performed may include an indication of the query for which assistant module 122B may determine and perform an action. In this case, assistant module 122B may have to parse query 126 itself to determine an appropriate response to query 126 without being directed by computing device 110A to perform a particular action. In other examples, the indication of a response to be outputted by computing device 110B may be any information that causes computing device 110B to output the response.

In the example where assistant module 122A and/or assistant module 122C proactively hands off the conversation, the indication of the conversation may include an indication of a task to be performed by computing device 110B, or an indication of information that is to be outputted by computing device 110B, such as an interactive map that provides to a restaurant. In the example of FIG. 1, if assistant module 122A determines, from analyzing query 126, that an appropriate response would be to output a visual map of directions from the user's location to Luigi's restaurant, assistant module 122A may direct assistant module 122B to cause computing device 110B to output a visual map of directions from the user's location to Luigi's restaurant. In another example, assistant module 122A may direct module 122B to cause computing device 110B to output directions from the user's location to Luigi's restaurant without specifying how to output those directions. In this case, assistant module 122B may determine that such directions should be presented visually.

Assistant module 122B at computing device 110B may receive the handoff from assistant module 122A and/or assistant module 122C, including receiving an indication of conversation 132 that includes an indication of a response to be outputted by computing device 110B to respond to query 126. In the case of FIG. 1, assistant module 122B may generate a visual map of directions from the user's location to Luigi's restaurant. Assistant module 122B may output the generated response in many ways. For example, assistant module 122B may output the response in the form of notification 116 in user interface 114. Upon UIC 112B receiving user input that activates notification 116, such as by tapping, swiping, or otherwise selecting notification 116, UIC 112B may output the visual map of directions from the user's location to Luigi's restaurant. In other examples, upon receiving an indication of conversation 132 and an indication of a response to be outputted by computing device 110B to respond to query 126, computing device 110B may automatically, without user intervention, open a map application in order to display the visual map of directions. In another example, upon receiving an indication of conversation 132 and an indication of a response to be outputted by computing device 110B to respond to query 126, computing device 110B may automatically, without user intervention, open a virtual assistant application in order to display the visual map of directions Assistant module 122A and/or assistant module 122C may perform the handoff of a conversation from computing device 110A to computing device 110B in multiple ways. As discussed above, assistant module 122A and/or assistant module 122C may determine whether to handoff the conversation, and may also determine the computing device that is to receive the handoff. Similarly, assistant module 122A, assistant module 122C, or a combination of assistant module 122A and assistant module 122C may perform the handoff of a conversation from computing device 110A to computing device 110B.

In one example, assistant module 122A may perform the handoff of a conversation from computing device 110A to computing device 110B by directly communicating with assistant module 122B, either via network 130 (e.g., the internet), via short-range direct communications (e.g., via Bluetooth) between computing device 110A and computing device 110B, or via a combination of network 130 and short-range direct communications. In another example, assistant module 122C may perform the handoff of a conversation from computing device 110A to computing device 110B by communicating with assistant module 122B via network 130.

Alternatively, a combination of assistant module 122A and assistant module 122C may perform the handoff of a conversation from computing device 110A to computing device 110B. Assistant module 122A may communicate with assistant module 122B either via network 130 (e.g., the internet), via short-range direct communications (e.g., via Bluetooth) between computing device 110A and computing device 110B, or via a combination of network 130 and short-range direct communications, while assistant module 122C may communicate with assistant module 122B via network 130.

After receiving handoff of conversation 132, assistant module 122B, alone or in combination with assistant module 122C, may continue to receive user interactions as part of conversation 132, and may also generate responses to those user interactions. For example, assistant module 122B may receive voice input "call them" as query 128, and assistant module 122B and/or assistant module 122C may generate a response to query 128.

If assistant module 122B generates the response in conjunction with assistant module 122C, assistant module 122B may send the response to assistant module 122C, and assistant module 122C, alone or in combination with assistant module 122B, may generate the response. Because assistant module 122B and/or assistant module 122C is able to access contextual information associated with conversation 132 stored user information data store 124B and/or user information data store 124C, assistant module 122B and/or assistant module 122C may be able to determine whether query 128 refers to a portion of the conversation that took place between the user and assistant module 122A prior to the hand off of conversation 132.

For example, assistant module 122B and/or assistant module 122C may infer, from such contextual information, that "them" in query 128 refers to Luigi's restaurant, which originated from a portion of the conversation that took place between the user and assistant module 122A prior to the hand off of conversation 132. Therefore, assistant module 122B may interpret query 128 as a request to call the phone number associated with Luigi's restaurant. Thus, assistant module 122B and/or assistant module 122C may be able to formulate a relevant response to query 128.

If assistant module 122B generates the response in conjunction with assistant module 122C, assistant module 122C may send an indication of the response to assistant module 122B for output by UIC 112B of computing device 110B. Assistant module 122B may therefore enable computing device 110B to place a phone call to the phone number associated with Luigi's restaurant, and may output indication 129 that computing device 110B is placing such a phone call.

In this way, assistant module 122A at computing device 110A in conjunction with assistant module 122C at digital assistant server 160 may proactively handoff conversations that takes place between a user and computing device 110A to assistant module 122B at computing device 110B. In response to receiving the handoff of the conversation, assistant module 122B at computing device 110A may be able to output a response to a request received by assistant module 122A at computing device 110A. Assistant module 122B may be able to access contextual information associated with the conversation, so that assistant module 122B may determine when a request that it receives refers to a portion of the conversation that took place between the user and assistant module 122A.

The techniques described in the context of FIG. 1 as well as throughout the disclosure may improve the functioning of computing device 110A and computing device 110B in a number of ways. For example, because the techniques of this disclosure enable computing device 110A to handoff a conversation to computing device 110B without an explicit user command to do so, it reduces the amount of user interaction with computing device 110A because a user does not have to explicitly instruct computing device 110A to handoff a conversation to computing device 110B.

Further, rather than simply outputting an error or other message indicating the user should use a different device to complete the query, requiring the user to repeat the query at the second computing platform, and the like, the assistant may enable the user to simply continue the conversation at the second computing platform without needing to repeat the same user interactions the user previously provided at the first computing platform.

The techniques disclosed herein therefore may also reduce the amount of user interaction with computing device 110B. Because the techniques of this disclosure enable computing device 110A to proactively handoff a conversation to computing device 110B, so that computing device 110B outputs a response in place of computing device 110A, the user does not need to issue a query to computing device 110B to receive the same response that was outputted by computing device 110B as part of handing off the conversation from computing device 110A to 110B.

Further, because handing off a conversation from computing device 110A to computing device 110B includes transferring an indication of context information of the conversation to computing device 110B, computing device 110B is able to more accurately interpret user input that refers back to a portion of the conversation that took place with computing device 110A. Computing device 110A may then be able to perform an action or output a response in response to the user input that is likely to be more useful and meaningful, thereby lessening the need for the user issue a query to computing device 110B to receive the same response.

Moreover, the techniques of this disclosure may also increase user comprehension of answers provided by the assistant by identifying other devices that may be better suited to output the answer. In this way, techniques of this disclosure may reduce the number of user inputs required for the user to receive and comprehend an answer, and may reduce the amount of time the assistant is actively executing and processing information at a computing device.

Figure 2:
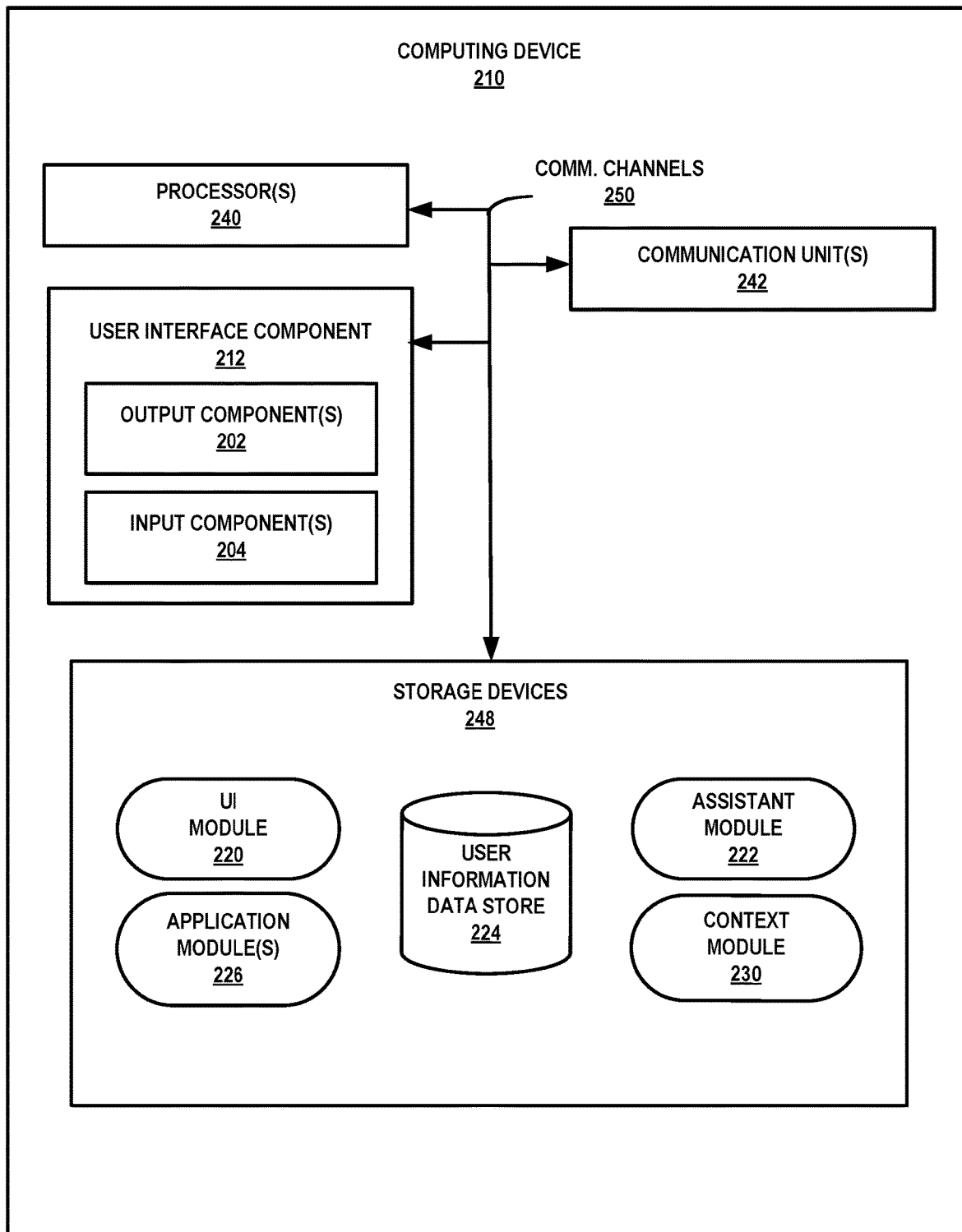
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110A and/or 110B of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, and one or more storage components 248. UIC 212 includes output component 202 and input component 204. Storage components 248 of computing device 210 include UI module 220, assistant module 222, user information data store 224, one or more application modules 226, and context module 230.

Communication channels 250 may interconnect each of the components 212, 240, 242, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a global positioning satellite (GPS) receiver, or any other type of device that can send and/or receive information. Other examples of communication units 242 may include short wave radios, cellular data radios, wireless network radios, as well as universal serial bus (USB) controllers.

One or more input components 204 of computing device 210 may receive input. Examples of input are tactile, audio, and video input. Input components 204 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 204 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 202 of computing device 110 may generate output. Examples of output are tactile, audio, and video output. Output components 202 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112A and 112B of computing devices 110A and 110B, and includes output component 202 and input component 204. Output component 202 may be a display component, such as a screen at which information is displayed by UIC 212 and input component 204 may be a presence-sensitive input component that detects an object at and/or near output component 202. Output component 202 and input component 204 may be a speaker and microphone pair or any other combination of one or more input and output components, such as input components 204 and output components 202. In the example of FIG. 2, UIC 212 may present a user interface (such as user interface 114 of FIG. 1).

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store data accessed by modules 220, 222, 230, and 226, and data store 224 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 230, and 226, and data store 224. Storage components 248 may include a memory configured to store data or other information associated with modules 220, 222, 230, and 226, and data store 224.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 230, and 226 may be operable by processors 240 to perform various actions, operations, or functions of computing device 210. For example, processors 240 of computing device 210 may retrieve and execute instructions stored by storage components 248 that cause processors 240 to perform the operations modules 220, 222, 230, and 226. The instructions, when executed by processors 240, may cause computing device 210 to store information within storage components 248, for example, at data stores 224.

UI module 220 may include all functionality UI modules 120 of FIG. 1 and may perform similar operations as UI modules 120 for executing an assistant as part of computing device 210. UI module 220 may manage user interactions with UIC 212 and other components of computing device 210. UI module 220 may cause UIC 212 to output a user interface as a user of computing device 210 views output and/or provides input at UIC 212.

User information data store 224 is an example of user information data stores 124A and 124B of FIG. 1. Assistant module 222 may include all functionality of assistant modules 122A and 122B of FIG. 1, and may perform similar operations as assistant modules 122A and 122B for executing an assistant as part of computing device 210 and maintaining and accessing user information at user information data store 224. In some examples, assistant module 222 may execute locally (e.g., at processors 240) to provide assistant functions. In some examples, assistant module 222 may act as an interface to a remote assistant service accessible by computing device 210, such as assistant module 122B executing at digital assistant server 160, as shown in FIG. 1. For example, assistant module 222 may be an interface or application programming interface (API) to assistant modules 122A and/or 122B of digital assistant server 160 of FIG. 1.

One or more application modules 226 represent all the various individual applications and services executing at and accessible from computing device 210 that may be accessed by an assistant to provide user with information and/or perform a task or action. Numerous examples of application modules 226 may exist and include, a fitness application, a calendar application, a search application, a map or navigation application, a travel application (e.g., planning, reservation, ticketing, etc.), a social media application, a game application, an e-mail application, a chat or messaging application, an Internet browser application, a restaurant reservation application, a movie ticket application, or any other applications that may execute at computing device 210. An assistant executing at computing device 210, such as assistant module 222, may cause application modules 226 to execute instructions for performing a plurality of actions associated with the assistant. In other words, the assistant may rely on application modules 226 to perform a plurality of actions on behalf of the assistant.

After receiving explicit consent from a user to store and make use of personal information (e.g., information stored at data store 224), context module 230 may process and analyze contextual information associated with computing device 210 to define a context of computing device 210, a context of a user of computing device 210, and/or a context of a conversation between assistant module 222 and a user. Context module 230 may encrypt or otherwise treat the information being analyzed and/or stored to remove the actual identity of the user before storing or making use of the personal. For example, the information may be treated by context module 230 so that any personally-identifiable information is removed when stored or sent to a remote computing device (e.g., digital assistant server 160) for processing. Context module 230 may only analyze information associated with computing device 210 and/or a user of computing device 210 if the user affirmatively consents to use or collection of such information. Context module 230 may further provide opportunities for the user to withdraw consent and in which case, context module 230 may cease collecting or otherwise retaining the information associated with computing devices 210 or the user of computing devices 210.

A context of computing device 210 may specify one or more characteristics associated with computing device 210 and/or the user of computing device 210 and his or her physical and/or virtual environment at various locations and times. For example, context module 230 may determine, as part of a context of computing device 210, a physical location associated with computing device 210 at a particular time based on the contextual information associated with computing device 210 from that particular time. As the contextual information changes (e.g., based on sensor information indicative of movement over time), context module 230 may update the physical location in the determined context of computing device 210.

The types of information that define a context of a computing device for a particular location and/or time are too numerous to list. As some examples, a context of a computing device may specify: an acoustic fingerprint, a video fingerprint, a location, a movement trajectory, a direction, a speed, a name of an establishment, a street address, a type of place, a building, weather conditions, and traffic conditions, at various locations and times. The context of the computing device may further include calendar information that defines a meeting or an event associated with various locations and times, webpage addresses viewed at various locations and times, text entries made in data fields of the webpages viewed at various locations and times (e.g., search or browsing histories), and other application usage data associated with various locations and times. The context of the computing device may further include information about audio and/or video streams accessed by or being broadcast in the presence of the computing device at various locations and times, television or cable/satellite broadcasts accessed by or being broadcast in the presence the computing device at various locations and times, and information about other services accessed by the computing device at various locations and times.

Context module 230 may share the context of computing device 210 with assistant module 222, and assistant module 222 may utilize the shared context to determine whether to perform an action, such as outputting a notification of an event. Context module 230 may respond to a request from assistant module 222 for a current context or current state associated with computing device 210, by outputting data to assistant module 222 that specifies the current state or context of the user.

In some examples, context module 230 may determine the context of a conversation between assistant module 222 and a user. A context of a conversation between assistant module 222 and a user may be one or more characteristics associated with words and phrases of a conversation between assistant module 222 and the user. As the conversation between assistant module 222 and the user takes place, context module 230 may track the conversation to classify and categorize various words and phrases used during the conversation. From the conversation, context module 230 may be able to derive the meanings of various words and phrases used during the conversation, and may classify and/or categorize particular words or phrases used during the conversation. For example, context module 30 may associate particular words or phrases used during the conversation with concepts such as people, dates and times, locations, events. Context module 230 may determine contextual information associated with the conversation and may store such contextual information into a data store, such as user information data store 224.

Context module 230 may be able to determine contextual information in any suitable fashion. For example, context module 230 may perform semantic analysis on the conversation to determine the meaning of various words and phrases. Context module 230 may also associate meanings to particular words and/or phrases of the conversation, and may tag, link, or otherwise associate particular words and/or phrases with particular tags. In essence, the context of the conversation enables the user and/or assistant module 222 to refer back to previous portions of the conversation, and for assistant module 222 to be able to correctly interpret such references back to the previous portions of the conversation. For example, if the conversation mentions a particular geographic location (e.g., a business, a landmark, an address, and the like), and if later in the conversation a reference is made to a previously-referenced location, assistant module 222 may be able to correctly interpret such a reference.

In some examples, assistant module 222 may interact with a user via UIC 212 as part of a conversation with the user. Such a conversation may be similar to conversation 132 of FIG. 1. As the conversation takes place, context module 230 may analyze the conversation to determine contextual information associated with the conversation, and may store such contextual information into user information data store 224. UIC 212 may receive an indication of user input that is at least a part of the conversation between the user and assistant module 222. Such user input may be a query, a request for assistant module 222 to perform a particular action (e.g., look up directions, make a restaurant reservation, buy movie tickets, etc.), and the like.

In response to receiving the query, assistant module 222 may determine whether to perform an action in response to the query or to handoff the conversation with the user to another computing device (i.e., a computing device external to computing device 210). Assistant module 222 may make the determination of whether to perform an action in response to the query or to handoff the conversation with the user to another computing device alone or in conjunction with a remote assistant service accessible to computing device 210, such as assistant module 122C executing at digital assistant server 160 shown in FIG. 1.

For example, if assistant module 222 makes the determination of whether to perform an action in response to the query or to handoff the conversation with the user to another computing device in conjunction with a remote assistant service, assistant module 222 may send, via communication units 242 over a network to the remote assistant service, an indication of the query received by the user. In response, assistant module may receive, via communication units 242 over a network from the remote assistant service, either an indication of the response to the query or an indication that the conversation between the user and assistant module 222 is to be handed off to a remote computing device.

In other examples, assistant module 222 may determine, without the use of the remote assistant service, whether it should perform an action in response to the query, or whether it should handoff the conversation between it and the user to a remote computing device, based on a variety of factors. Examples of such factors may include any one, or any combination of: the request, the type of the action to perform in response to the request, the capabilities of computing device 210, the capabilities of other computing devices associated with the user, the availability of the other computing devices associated with the user, the locations of the other computing devices associated with the user and/or their proximity to computing device 210, and the like.

Assistant module 222 may, as part of determining whether to handoff a conversation between it and a user to a remote computing device, determine the capabilities of one or more such remote computing devices associated with the user. In some examples, assistant module 222 may determine the capabilities of the remote computing devices associated with the user based on information stored in user information data store 224. User information data store 224 may store information regarding each of the remote computing devices with the user, including but not limited to the remote computing devices' functional capabilities, the remote computing devices' proximity to computing device 210, the last time the remote computing devices were active, whether the remote computing devices are trusted by the user, and the like.

In other examples, assistant module 222 may determine the functional capabilities of the remote computing devices associated with the user by communicating, via communication units 242, with remote servers (e.g., the cloud) to receive such information, or by directly communicating with the remote computing devices, such as via communication units 242. For example, if information regarding the functional capabilities of the remote computing devices associated with the user are stored at remote servers, assistant module 222 may query the remote servers for such information.

Assistant module 222 may also directly communicate with the remote computing devices to query the remote computing devices regarding their functional capabilities. In addition, assistant module 22 may directly communicate with the remote computing devices to determine other features, characteristics, or context of these remote computing devices. For example, assistant module 222 may utilize features of communication units 242, such as a Bluetooth radio or any other short-range communication units, like to determine whether any of the remote computing devices associated with the user is proximate computing device 210. Assistant module 222 may utilize communication units 242 to broadcast a short-range signal. If communication units 242 receives an indication from any one of the remote computing devices associated with the user that it has received the short-range signal, assistant module 222 may determine that such a remote computing device is proximate to computing device 210.

Based on the various factors described above, Assistant module 222 may determine whether to handoff the conversation between it and the user to another remote computing device. If assistant module 222 determines that it should handoff the conversation to a particular remote computing device to perform an action in response to a request, assistant module 222 may send a request to the remote computing device to handoff the conversation to the remote computing device. If assistant module 222 receives confirmation from the remote computing device to receive the handoff of the conversation, assistant module 222 may handoff the conversation to the remote computing device.

To handoff the conversation to the remote computing device, assistant module 222 may send an indication of the conversation as well as an indication of the response to the query that is to be outputted by the remote computing device. The indication of the conversation may identify the conversation to the remote computing device. For example, the indication of the conversation may include a conversation identifier that is associated with contextual information associated with the conversation that is stored at a remote assistant system. The remote computing device may utilize the conversation identifier to retrieve such contextual information associated with the conversation when formulating responses to additional queries it receives as part of the conversation.

In addition, indications of the conversation that is sent to the remote computing device may include partial or complete textual transcripts of the conversation, contextual information associated with the conversation as generated by context module 230, an indication of the request, an indication of the action to be performed in response to the request, and the like. Remote computing device may store such contextual information associated with the conversation into its own data store and may use such contextual information when formulating responses to additional queries it receives as part of the conversation.

Assistant module 222 may make the handoff of the conversation to a remote computing device by communicating directly or indirectly with the remote computing device. In some examples, assistant module 222 may make the handoff of the conversation through one or more intermediaries, such as a remote assistant system similar to digital assistant server 160 of FIG. 1. Thus, assistant module 222 may send to the digital assistant server any necessary information for handing off the conversation, and the digital assistant server may, in turn, send such information to the remote computing device. In other examples, assistant module 222 may make the handoff of the conversation by communicating directly with the remote computing device via any suitable direct connection technique. Thus, assistant module 222 may directly send to the remote computing device any necessary information for handing off the conversation.

In some examples, assistant module 222 may be the recipient of a request to receive a handoff of a conversation from a remote computing device. As part of receiving the handoff, assistant module may receive an indication of the conversation to the remote computing device. Such an indication of the conversation may include an indication of contextual information associated with the conversation. Such an indication of the conversation may also include an indication of an action to be performed in response to a request received by the remote computing device as part of the conversation.

Assistant module 222 may store such received information into user information data store 224. Assistant module 222 may also perform the action indicated to respond to the request. Assistant module 222 may perform the action in many ways. If the action to be performed is making a restaurant application, assistant module 222 may communicate with a restaurant reservation application (e.g., one of application modules 226 or an application at a computing device external to computing device 210) to make the requested restaurant reservation. If the action to be performed is assistant module 222 outputting directions to a particular location, assistant module 222 may cause output component 202 to output for display the directions to the location.

In some examples, assistant module 222 may determine the action to perform to respond to the request with or without receiving an indication of the action to be performed nor instructions to perform a specific action. In other words, assistant module 222 may receive an indication of the request and may determine which action to perform to respond to the request. Assistant module 222 may analysis the request to determine the intended meaning of the request, and may determine an action to perform to respond to the request.

In addition to performing the indicated action, assistant module 222 may continue the conversation that was handed off from the remote computing device to assistant module 222. Thus, assistant module 222 may continue to interact with a user to receive user input and to respond to such user input by performing one or more actions, all as a part of the handed off conversation. Assistant module 222 may be able to interpret the received user input based on contextual information received from the remote computing device and stored in user information data store 224. Thus, when the user input refers back to a previous part of the conversation that took place at the remote computing device, assistant module 222 may utilize the contextual information stored in user information data store 224 to properly interpret such user input. In addition, context module 230 may continue to track and analyze the conversation between assistant module 222 and the user to generate additional contextual information associated with the user, and may store such contextual information into user information data store 224.

Figure 3:
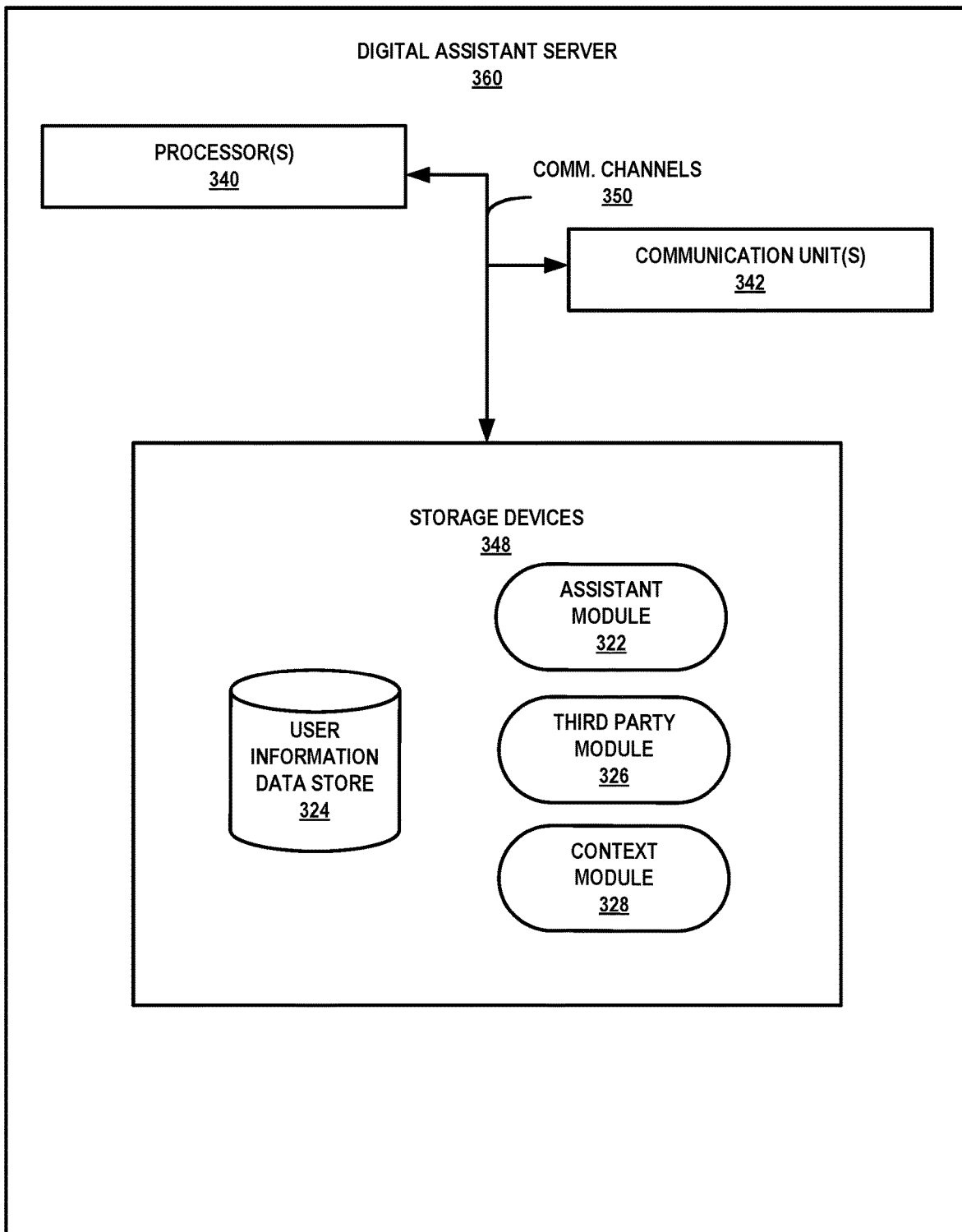
FIG. 3 is a block diagram illustrating an example digital assistant server that is configured to execute an example virtual assistant, in accordance with one or more aspects of the present disclosure.

FIG. 3 is a block diagram illustrating an example computing system that is configured to execute an example virtual assistant, in accordance with one or more aspects of the present disclosure. Digital assistant server 360 of FIG. 3 is described below as an example of digital assistant server 160 of FIG. 1. FIG. 3 illustrates only one particular example of digital assistant server 360, and many other examples of digital assistant server 360 may be used in other instances and may include a subset of the components included in example digital assistant server 360 or may include additional components not shown in FIG. 3. For example, digital assistant server 360 may comprise a cluster of servers, and each of the servers comprising the cluster of servers making up digital assistant server 360 may include all, or some, of the components described herein in FIG. 3, to perform the techniques disclosed herein.

As shown in the example of FIG. 3, digital assistant server 360 includes one or more processors 340, one or more communication units 342, and one or more storage devices 348. Storage devices 348 include assistant module 322, user information data store 324, third party module 326, and context module 328.

Processors 340 are analogous to processors 240 of computing device 210 of FIG. 2. Communication units 342 are analogous to communication units 242 of computing device 210 of FIG. 2. Storage devices 348 are analogous to storage devices 248 of computing device 210 of FIG. 2. Communication channels 350 are analogous to communication channels 250 of computing device 210 of FIG. 2 and may therefore interconnect each of the components 340, 342, and 348 for inter-component communications. In some examples, communication channels 350 may include a system bus, a network connection, an inter-process communication data structure, or any other method for communicating data.

In some examples, storage devices 348 is a temporary memory, meaning that a primary purpose of storage devices 44 is not long-term storage. In this example, storage devices 348 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, storage devices 348 may also include one or more computer-readable storage media. Storage devices 348 in some examples include one or more non-transitory computer-readable storage mediums. Storage devices 348 may be configured to store larger amounts of information than typically stored by volatile memory. Storage devices 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 348 may store program instructions and/or information (e.g., data) associated with modules 322, 326, and 328, and user information data store 324. Storage devices 348 may include a memory configured to store data or other information associated with modules 322, 326, and 328, and user information data store 324.

User information data store 324 is analogous to user information data store 224 of FIG. 2, and may be an example of user information data store 124C of FIG. 1. User information data store 42 may be configured to store information associated by the user that assistant module 322 has learned about the user of a computing device during conversations between the user and an assistant provided by assistant module 322. User information data store 324 may also store information regarding conversations between the user and assistant module 322 and/or assistant modules of other computing devices (e.g., assistant module 122A executing at computing device 110A or assistant module 122B executing at computing device 110B) as collected by context module 328. Assistant module 322 may rely on the information stored at user information data store 324, to determine the contextual meanings of words and phrases used during a conversation to interpret queries and to generate relevant responses to queries. In particular, after a conversation has been handed off from a first computing device (e.g., computing device 110A) to a second computing device (e.g., computing device 110B), assistant module 322 may utilize the information associated with the conversation as stored in user information data store 324 to properly connect words, phrases, the intent, and the like of queries received by computing device 110B with concepts such as people, places, things, locations, events, date and time, and the like in portions of the conversation that occurred prior to the handoff.

Assistant module 322 may include some or all functionality of assistant module 122C of FIG. 1 and assistant module 222 of computing device 210 of FIG. 2. Assistant module 322 may perform similar operations as assistant modules 122C and 222 for providing an assistant service that is accessible via a network, such as network 130. That is, assistant module 322 may act as an interface to a remote assistant service accessible to a computing device that is communicating over a network with digital assistant server 360. For example, assistant module 322 may be an interface or API to assistant module 122C of digital assistant server 160 of FIG. 1.

In operation, assistant module 322 may work in conjunction with assistant modules of computing devices (e.g., assistant modules 122A and 122B of computing devices 110A and 110B of FIG. 1) to assist those assistant modules to generate responses to queries and to determine whether to handoff conversations as those assistant modules conduct conversations between users and the assistant modules, and to assist in handing off conversations between assistant modules 122A and 122B. Assistant module 322 may assist assistant modules 122A and 122B in analyzing the query in order to formulate a response to the query. For example, assistant module 322 may receive an indication of voice input received by assistant modules 122A and 122B, and may perform voice recognition on the voice input. In another example, assistant module 322 may be able to translate input received by those assistant modules from one language to another language. In general, because digital assistant server 360 executes on a server device or on a cluster of server devices, such as the cloud, assistant module 322 may assist with assistant modules of computing devices by performing such processing-intensive tasks such as voice recognition and translation.

Assistant module 322 may monitor a conversation between a user and an assistant module executing at a remote computing device. For example, assistant module 322 may receive indications of queries received from the user by the assistant module executing at the remote computing device, as well as responses to the queries. In some examples, assistant module 322 may participate in a conversation between a user and an assistant module executing at a remote device. Assistant module 322 may receive indications of queries received by the assistant module executing at the remote computing device. In response, assistant module 322 may determine responses to the queries and may send indications of the generated responses to the assistant module executing at the remote device.

After receiving explicit consent from a user to store and make use of personal information (e.g., information stored at user information data store 324), context module 328 may collect, derive, or otherwise determine contextual information associated with conversations monitored by assistant module 322 and/or conversations in which assistant module 322 participates to generate responses to queries. Context module 328 may also collect contextual information associated with the remote computing device that work in conjunction with assistant module 322 to generate responses to queries. Context module 328 may encrypt or otherwise treat such information to remove personal information or any other information which may expose the actual identity of the user before storing or making use of such information. For example, the information may be treated by context module 328 so that any personally-identifiable information is removed when stored in user information data store 324. Context module 328 may only collect or retain information if the user affirmatively consents to use or collection of such information. Context module 328 may further provide opportunities for the user to withdraw consent and in which case, context module 328 may cease collecting or otherwise retaining such information.

Contextual information associated with a conversation between a user and an assistant module executing at a remote computing device, and/or a conversation in which assistant module 322 participates to generate responses, may include one or more characteristics or concepts associated with words and phrases of the conversation, including but not limited to people, places, things, locations, events, date and time, and the like.

As the conversation takes place, context module 328 may track the conversation to classify and categorize various words and phrases used during the conversation. From the conversation, context module 328 may be able to derive the meanings of various words and phrases used during the conversation, and may classify and/or categorize particular words or phrases used during the conversation. Context module 328 may associate particular words or phrases used during the conversation with concepts such as people, dates and times, locations, events. Context module 328 may determine contextual information associated with the conversation and may store such contextual information into a data store, such as user information data store 324. For example, if the conversation references a restaurant reservation, context module 328 may collect information such as the restaurant, the location of the restaurant, the date and time of the reservation, and the like, and may associate each of the collected information with concepts such as place, date, time, location, event, and the like. Context module 328 may store, in user information data store 324, such associations of the various concepts with the words or phrases in the conversation.

Context module 328 may be able to determine contextual information in any suitable fashion. For example, context module 328 may perform semantic analysis on the conversation to determine the meaning of various words and phrases. Context module 328 may also associate meanings to particular words and/or phrases of the conversation, and may tag, link, or otherwise associate particular words and/or phrases with particular tags and store such associations in user information data store 324. In essence, the context of the conversation enables the user and/or assistant modules (e.g., assistant module 322) to refer back to previous portions of the conversation, and for assistant modules to be able to correctly interpret such references back to the previous portions of the conversation. For example, if the conversation mentions a particular geographic location (e.g., a business, a landmark, an address, and the like), and if later in the conversation a reference is made to a previously-referenced location, such as a query to "give me directions to there," assistant module 322 may be able to correctly interpret such a reference as referring to the previously-referenced location.

In some examples, assistant module 322 may determine a response to a query received by an assistant module executing at a remote computing device, and may also determine whether to handoff a conversation between a user and a first assistant module executing at a first remote computing device to a second assistant module executing at a second remote computing device. Assistant module 322 may determine whether to handoff the conversation based on a variety of factors discussed throughout this Application. Examples of such factors may include any one, or any combination of: the request, the type of the action to perform in response to the request, the capabilities of the computing device that received the query, the capabilities of computing devices associated with the user other than the computing device that received the query, the availability of the other computing devices associated with the user, the locations of the other computing devices associated with the user and/or their proximity to the computing device that received the query, and the like.

Assistant module 322 may, as part of determining whether to handoff a conversation, determine the capabilities of one or more remote computing devices associated with the user. In some examples, assistant module 322 may determine the capabilities of the remote computing devices associated with the user based on information stored in user information data store 324. User information data store 324 may store information regarding each of the remote computing devices with the user, including but not limited to the remote computing devices' functional capabilities, the remote computing devices' proximity to the computing device that received the query, the last time the remote computing devices were active, whether the remote computing devices are trusted by the user, and the like.

In other examples, assistant module 322 may determine the functional capabilities of the remote computing devices associated with the user by communicating, via communication units 342, with remote servers (e.g., the cloud) to receive such information, or by directly communicating with the remote computing devices, such as via communication units 342. For example, if information regarding the functional capabilities of the remote computing devices associated with the user are stored at remote servers, assistant module 322 may query the remote servers for such information.

In some examples, assistant module 322 may determine whether to handoff a conversation in conjunction with third party applications (e.g., third party applications 172 shown in FIG. 1). Third party module 326 of digital assistant server 360 may interact with third party applications on behalf of digital assistant server 360. That is, third party module 326 interact with third party applications on behalf of assistant module 322. Third party module 326 may implement an API or an interface that is accessible by third party applications, so that assistant module 322 may utilize third party applications 172 to perform tasks as part of determining a response to a query and as part of determining whether to handoff the conversation.

In some examples, assistant module 332 may receive, via third party module 326 from a third party application, an indication of a response to a query, an indication to handoff the conversation, and/or an indication of the computing device that should receive the handoff. In response, assistant module 332 may determine the response to the query based at least in part on the indication of the response, determine whether to handoff the conversation based at least in part on the indication to handoff the conversation, and/or the computing device to receive the handoff based at least in part on the indication of the computing device that should receive the handoff.

In addition, assistant module 322 may assist in handing off a conversation from one computing device to another computing device (e.g., from computing device 110A to computing device 110B in FIG. 1). For example, assistant module 322 may store information regarding computing devices that are associated with particular users in user information data store 324. In response to receiving a request for information regarding the computing devices are associated with a user, assistant module 322 may access user information data store 324 for such information, and may return information regarding the computing devices that are associated with the user.

Based on the various factors described above, Assistant module 322 may determine whether to handoff the conversation to another remote computing device and to select the remote computing device that is to receive handoff of the conversation. In some examples, assistant module 322 may not be involved in the process of handing off the conversation. In this case, assistant module 322 may send to the remote computing device that received the query an indication that it is to hand off the conversation to another remote computing device. Such an indication may include an indication of the remote computing device that is to receive the hand off, an indication of a response to the query, and the like.

In some examples, assistant module 322 may perform handoff of the conversation to a remote computing device. To handoff the conversation to the remote computing device, assistant module 322 may send to the remote computing device a request to receive the handoff of the conversation. The request may include an indication of the conversation, an indication of the response to the query that is to be outputted by the remote computing device, and the like. The indication of the conversation may identify the conversation to the remote computing device. For example, the indication of the conversation may include a conversation identifier that is associated with contextual information associated with the conversation that is stored at user information data store 324. The remote computing device may utilize the conversation identifier to retrieve from user information data store 324 information associated with the conversation when formulating responses to additional queries it receives as part of the conversation.

Figure 4:
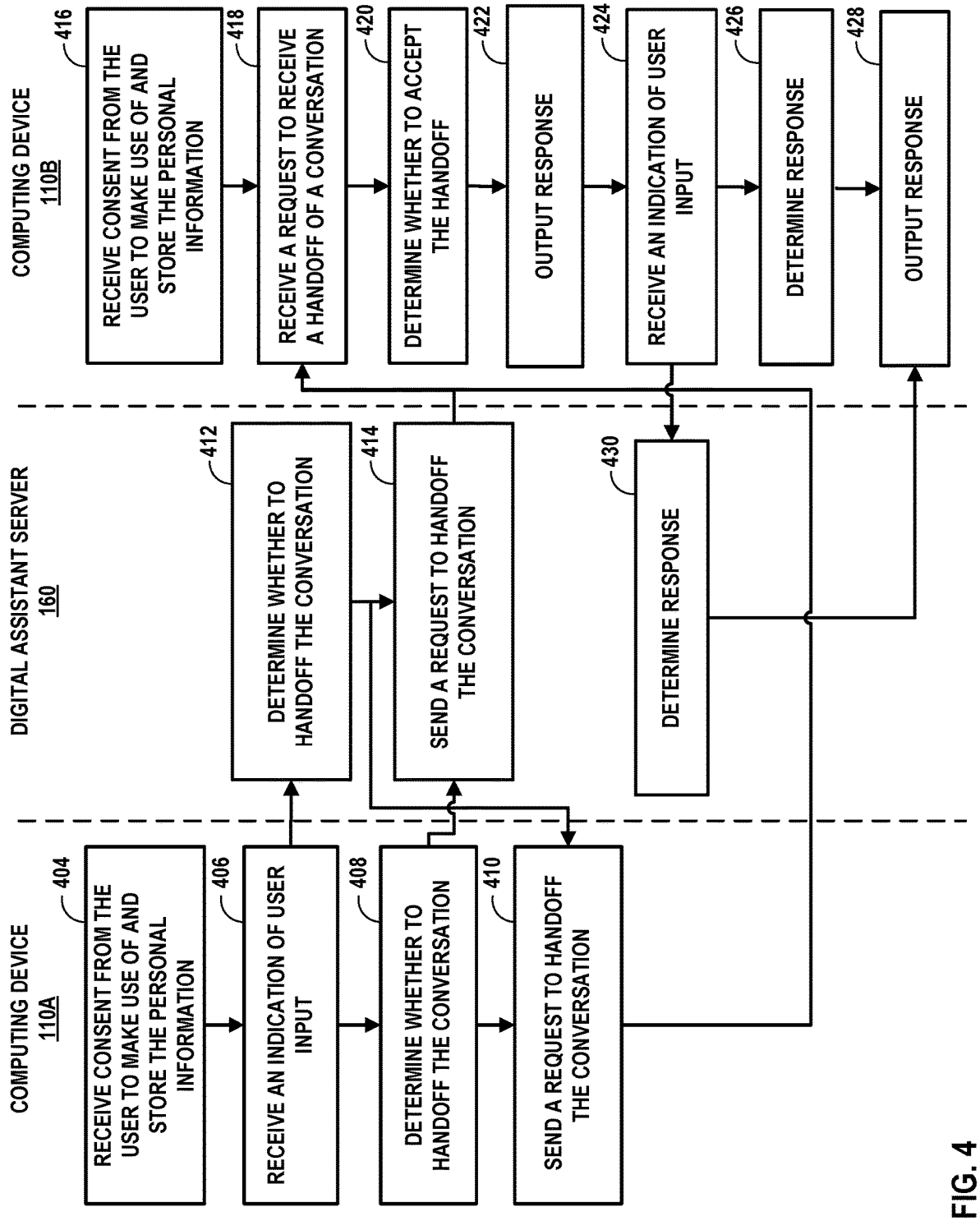
FIG. 4 is a flowchart illustrating example operations performed by one or more processors executing one or more example virtual assistants, in accordance with one or more aspects of the present disclosure.

FIG. 4 is a flowchart illustrating example operations performed by one or more processors executing one or more example virtual assistants, in accordance with one or more aspects of the present disclosure. As shown in FIG. 4, operations 404-410 are described below in the context of computing device 110A shown in FIG. 1, operations 412-414 and 430 are described below in the context of digital assistant server 160 shown in FIG. 1, and operations 416-428 are described below in the context of computing device 110B shown in FIG. 1.

For example, assistant module 122A shown in FIG. 1 may execute at one or more processors of computing device 110A to perform operations 400-406, in accordance with one or more aspects of the present disclosure. Assistant module 122B shown in FIG. 1 may execute at one or more processors of computing device 110B to perform operations 416-428, in accordance with one or more aspects of the present disclosure. Assistant module 122C shown in FIG. 1 may execute at one or more processors of digital assistant server 160 to perform operations 412, 414, and 430, in accordance with one or more aspects of the present disclosure.

In operation, computing device 110A may receive consent from a user to make use of and store the personal information prior to making use and storing such personal information (404). For instance, in response to identifying potential personal information, assistant module 122A may cause UI module 120A to request permission from the user to store and make use of personal information obtained during interactions with assistant module 122A and the user. It should be understood that computing device 110A may not require a user to consent prior to each time that assistant module 122A wants to make use of or store personal information. For example, if computing devices 110A receives consent once a year, once a day, or even just one time (e.g., after initial product purchase, during initial set up, etc.) computing device 110A may treat that prior consent as consent to make use and store personal information in the future. As one example of how a user may provide consent, the user may provide a voice input "yeah that's ok to store information about me" detected by UIC 112A and in response to the voice input, assistant module 122A may begin maintaining personal records about the user at data store 124A. It should be understood that the user is able to explicitly or implicitly revoke any permission previously given at any time.

Computing device 110A may receive an indication of user input of a query that forms at least a part of a conversation between a user and assistant module 122A executing at computing device 110A (406). Computing device 110A may determine whether to handoff the conversation from assistant module 122A executing at computing device 110A to another computing device (408). By handing off the conversation to another computing device, the computing device that receives the hand off of the conversation may output a response to the query instead of computing device 110A.

In some examples, if the query includes explicit instructions to handoff the conversation to another computing device, assistant module 122A may follow the explicit instructions to handoff the conversation to the computing device specified by the query. In other examples, assistant module 122A may determine a response to the query and may determine, based at least in part on the response to the query, whether to handoff the conversation to another computing device.

Determining whether to handoff the conversation to another computing device may be based at least in part on the response to the query and, more specifically, determining the form in which the response is presented. For example, assistant module 122A may determine whether the response is to be audibly output (e.g., as spoken output), visually output (e.g., as an image or video), output as an interactive GUI (e.g., output as an interactive map of directions), and the like. If computing device 110A is not capable of presenting the response in the determined form, or if computing device 110A is not optimized for presenting the response in the determined form, then assistant module 122A may determine whether the user is associated with another computing device that is capable of presenting the response in the determined form, and/or optimized to present the response in the determined form.

To determine whether the user is associated with another computing device that is capable of presenting the response in the determined form, and/or optimized to present the response in the determined form, Assistant module 122A may determine the computing devices that are associated with the user other than computing device 110A, as well as determine the computing devices associated with the user that are available to receive handoff of the conversation. Assistant module 122A may determine, out of the computing devices associated with the user that are available to receive handoff of the conversation, one or more computing devices that are functionally capable of presenting the response in the determined form.

If assistant module 122A determines that another computing device associated with the user is available to receive handoff of the conversation and is functionally capable of presenting the response in the determined form, then assistant module 122A may determine that the conversation be handed off to the other computing device. In other words, assistant module 122A may determine whether to hand off the conversation based at least in part on a difference in functional capabilities between computing device 110A and the other computing device.

For example, if assistant module 122A determines that the response to the query is to be visually outputted, assistant module 122A may determine whether computing device 110A is operably coupled to a display device. If computing device 110A is not operably coupled to a display device, assistant module 122A may determine whether another computing device associated with the user is operably coupled to a display device. If the other computing device associated with the user is operably coupled to a display device, assistant module 122A may determine that the conversation be handed off to the other computing device associated with the user.

In some examples, assistant module 122A may determine the response to the query by communicating with or otherwise utilizing third party applications 172 executing at third party server systems 170 to determine the response to the query. Third party applications 172 may be applications that may be able to access third party services, such as a ticket purchasing service, a ride hailing service, and the like, in order to determine a response to the query. Assistant module 122A may provide an API that third party applications 172 may access in order to interact with assistant module 122A.

In some examples, as third party applications 172 execute to determine a response to the query in conjunction to assistant module 122A, third party application 172 may send an indication of whether to handoff the conversation from the first assistant executing at the first computing device to the second assistant executing at a second computing device. For example, if the query is a request for assistant module 122A to purchase tickets to a concert, assistant module 122A may direct third party applications 172 to access a ticket purchasing service to purchase tickets to the concert. In response, third party application 172 may send to assistant module 122A an indication that the response be a visual representation of the seating chart of the concert venue.

In response, assistant module 122A may determine whether computing device 110A is capable of outputting a visual representation of the seating chart of the concert venue. If computing device 110A is not capable of outputting a visual representation of the seating chart of the concert venue, assistant module 122A may handoff the conversation to another computing device that is capable of visual representation of the seating chart of the concert venue. In this way, computing device 110A may determine whether to handoff the conversation based on the indication of whether to handoff the conversation received from third party applications 172.

If two or more computing devices associated with the user that are available to receive handoff of the conversation are functionally capable of presenting the response in the determined form, assistant module 122A may select one of the two or more computing devices to receive handoff of the conversation based on various factors discussed above. In one instance, assistant module 122A may select the computing device that is relatively more optimized to present the response in the determined form. For example, if the response is to be presented visually, and if each of the two or more computing devices is operably coupled to a display device, assistant module 122A may select the computing device operably coupled to the display device with the relatively larger display area as the device to receive handoff of the conversation. In another example, assistant module 122A may select one of the two or more computing devices to receive handoff of the conversation based on its proximity (i.e., physical distance) to computing device 110A. In the example of FIG. 4, assistant module 122A may select computing device 110B to receive handoff of the conversation.

The handoff of the conversation to computing device 110B may be performed in many ways. In one example, in response to determining to handoff the conversation to computing device 110B, computing device 110A may send to computing device 110B a request to receive handoff of the conversation (410). The request to handoff the conversation may include an indication of a response to the query that is to be outputted by computing device 110B, an indication of the contents of the conversation that's taken place so far between the user and assistant module 122A, contextual information associated with the conversation, and the like.

In some examples, assistant module 122C executing at digital assistant server 160 may, in place of or in conjunction with assistant module 122A executing at computing device 110A, determine whether to handoff the conversation from assistant module 122A executing at computing device 110A to another computing device. For example, in response to computing device 110A receiving an indication of user input of a query that forms at least a part of a conversation between a user and assistant module 122A executing at computing device 110A (406), assistant module 122A executing at computing device 110A may send an indication of the query to digital assistant server 160.

Digital assistant server 160 may receive, from computing device 110A, the indication of the query. In response, assistant module 122C executing at digital assistant server 160 may determine whether to handoff the conversation from assistant module 122A executing at computing device 110A to another computing device (412). By handing off the conversation to another computing device, the computing device that receives the hand off of the conversation may output a response to the query instead of computing device 110A.

Assistant module 122C may perform techniques similar to those performed by computing device 110A to determine whether to handoff the conversation to a computing device other than computing device 110A. For example, if the query includes explicit instructions to handoff the conversation to another computing device, assistant module 122C may follow the explicit instructions to handoff the conversation to the computing device specified by the query.

Assistant module 122C may also determine whether to handoff the conversation to another computing device may be based at least in part on determining the form in which the response is presented. For example, assistant module 122C may determine whether the response is to be audibly output (e.g., as spoken output), visually output (e.g., as an image or video), output as an interactive GUI (e.g., output as an interactive map of directions), and the like.

Assistant module 122C may determine whether computing device 110A is capable of presenting the response in the determined form. For example, assistant module 122C may utilize stored information regarding the capabilities of computing device 110A to make such a determination. In another example, assistant module 122C may send a query to computing device 110A regarding its capabilities, and may, in response, receive an indication of computing device 110A's capabilities. If computing device 110A is not capable of presenting the response in the determined form, or if computing device 110A is not optimized for presenting the response in the determined form, then assistant module 122C may determine whether the user is associated with another computing device that is capable of presenting the response in the determined form, and/or optimized to present the response in the determined form.

To determine whether the user is associated with another computing device that is capable of presenting the response in the determined form, and/or optimized to present the response in the determined form, Assistant module 122C may determine the computing devices that are associated with the user other that computing device 110A, as well as determine the computing devices associated with the user that are available to receive handoff of the conversation. Assistant module 122C may determine, out of the computing devices associated with the user that are available to receive handoff of the conversation, one or more computing devices that are functionally capable of presenting the response in the determined form.

If assistant module 122C determines that another computing device associated with the user is available to receive handoff of the conversation and is functionally capable of presenting the response in the determined form, then assistant module 122C may determine that the conversation be handed off to the other computing device. In other words, assistant module 122C may determine whether to hand off the conversation based at least in part on a difference in functional capabilities between computing device 110A and the other computing device.

For example, if assistant module 122C determines that the response to the query is to be visually outputted, assistant module 122C may determine whether computing device 110A is operably coupled to a display device. If computing device 110A is not operably coupled to a display device, assistant module 122C may determine whether another computing device associated with the user is operably coupled to a display device. If the other computing device associated with the user is operably coupled to a display device, assistant module 122C may determine that the conversation be handed off to the other computing device associated with the user.

Similar to assistant module 122A, in some examples, assistant module 122C may determine the response to the query by communicating with or otherwise utilizing third party applications 172 executing at third party server systems 170 to determine the response to the query. Third party applications 172 may be applications that may be able to access third party services, such as a ticket purchasing service, a ride hailing service, and the like, in order to determine a response to the query. Assistant module 122C may provide an API that third party applications 172 may access in order to interact with assistant module 122C.

In some examples, as third party applications 172 execute to determine a response to the query in conjunction to assistant module 122C, third party application 172 may send an indication of whether to handoff the conversation from the first assistant executing at the first computing device to the second assistant executing at a second computing device. For example, if the query is a request for assistant module 122C to purchase tickets to a concert, assistant module 122C may direct third party applications 172 to access a ticket purchasing service to purchase tickets to the concert. In response, third party application 172 may send to assistant module 122C an indication that the response be a visual representation of the seating chart of the concert venue.

In response, assistant module 122C may determine whether computing device 110A is capable of outputting a visual representation of the seating chart of the concert venue. If computing device 110A is not capable of outputting a visual representation of the seating chart of the concert venue, assistant module 122C may handoff the conversation to another computing device that is capable of visual representation of the seating chart of the concert venue. In this way, assistant module 122C may determine whether to handoff the conversation based on the indication of whether to handoff the conversation received from third party applications 172.

If two or more computing devices associated with the user that are available to receive handoff of the conversation are functionally capable of presenting the response in the determined form, assistant module 122C may select one of the two or more computing devices to receive handoff of the conversation based on various factors discussed above. In one instance, assistant module 122C may select the computing device that is relatively more optimized to present the response in the determined form. For example, if the response is to be presented visually, and if each of the two or more computing devices is operably coupled to a display device, assistant module 122C may select the computing device operably coupled to the display device with the relatively larger display area as the device to receive handoff of the conversation. In another example, assistant module 122C may select one of the two or more computing devices to receive handoff of the conversation based on its proximity (i.e., physical distance) to computing device 110A. In the example of FIG. 4, assistant module 122C may select computing device 110B to receive handoff of the conversation.

The handoff of the conversation to computing device 110B may be performed in many ways. In one example, in response to determining to handoff the conversation to computing device 110B, computing device 110C may send to computing device 110B a request to receive handoff of the conversation (414). The request to handoff the conversation may include an indication of a response to the query that is to be outputted by computing device 110B, an indication of the contents of the conversation that's taken place so far between the user and assistant module 122A, contextual information associated with the conversation, and the like.

As shown in FIG. 4, both computing device 110A and digital assistant server 160 are able to determine whether to handoff the conversation (i.e., operations 406 and 412), as well as to send a request to handoff the conversation to computing device 110B (i.e., operations 410 and 414). In some examples, in response to performing operation 408 to determine to handoff the conversation to computing device 110B, assistant module 122A executing at computing device 110A may direct assistant module 122C executing at digital assistant server 160 to perform operation 414 to send a request to handoff the conversation to computing device 110B. Similarly, in some examples, in response to performing operation 412 to determine to handoff the conversation to computing device 110B, assistant module 122C executing at digital assistant server 160 may direct assistant module 122A executing at computing device 110A to perform operation 410 to send a request to handoff the conversation to computing device 110B.

Computing device 110B may receive consent from a user to make use of and store the personal information (416). For instance, in response to identifying potential personal information, assistant module 122B may cause UI module 120B to request permission from the user to store and make use of personal information obtained during interactions with assistant module 122B and the user. It should be understood that computing device 110B may not require a user to consent prior to each time that assistant module 122B wants to make use of or store personal information. For example, if computing devices 110B receives consent once a year, once a day, or even just one time (e.g., after initial product purchase, set up, etc.) computing device 110B may treat that prior consent as consent to make use and store personal information in the future. As one example of how a user may provide consent, the user may provide a voice input "yeah that's ok to store information about me" detected by UIC 112B and in response to the voice input, assistant module 122B may begin maintaining personal records about the user at data store 124B. It should be understood that the user may revoke any permission previously given at any time.

Computing device 110B may receive a request from computing device 110A or from digital assistant server 160 to receive a handoff of a conversation (418). Such a request may include at least an indication of the conversation, an indication of the response to be outputted by computing device 110B, an indication of the contents of the conversation that's taken place so far between the user and assistant module 122A, contextual information associated with the conversation, and the like.

In response to receiving the request from computing device 110A or from digital assistant server 160 to receive handoff of the conversation, computing device 110B may determine whether to accept handoff of the conversation (420). If computing device 110B accepts handoff of the conversation, computing device 110B may output the response, so that the response forms a part of the conversation that is now between the user and assistant module 122B executing at computing device 110B.

The user may continue the conversation with assistant module 122B by interacting with UIC 112B of computing device 110B to provide user input. UIC 112B may receive an indication of the user input that is indicative of a query from the user (424). The query may refer back to previous portions of the conversation that took place between the user and assistant module 122A prior to handoff of the conversation to assistant module 122B executing at computing device 110B Assistant module 122B may determine a response to the query (426) and may output the response to the query at UIC 112B (428). Because the query refers back to previous portions of the conversation that took place between the user and assistant module 122A prior to handoff of the conversation to assistant module 122B executing at computing device 110B, assistant module 122B may utilize contextual information associated with the conversation to determine a response to the query. Such contextual information may have been previously received by computing device 110B from computing device 110A and/or digital assistant server 160 as part of performing handoff of the conversation. For example, if the query refers back to a time, a place, a location, an event, a person, a movie, a tv show, a song, and the like that was discussed in the portions of the conversation that took place between the user and assistant module 122A prior to handoff of the conversation to assistant module 122B executing at computing device 110B, assistant module 122B may utilize the contextual information associated with the conversation to generate the response by mapping such references in the query to a particular place, location, event, person, movie, tv show, song, and the like that was discussed in the portions of the conversation that took place between the user and assistant module 122A prior to handoff of the conversation to assistant module 122B executing at computing device 110B In some examples, instead of determining the response to the query, assistant module 122B may send an indication of the query to assistant module 122C executing at digital assistant server 160. Similar to assistant module 122B, assistant module 122C may utilize contextual information associated with the conversation to determine a response to the query. Such contextual information may have been previously determined by assistant module 122C as a part of monitoring the conversation between the user and assistant module 122A, or received by digital assistant server 160 as part of performing handoff of the conversation. For example, if the query refers back to a time, a place, a location, an event, a person, a movie, a tv show, a song, and the like that was discussed in the portions of the conversation that took place between the user and assistant module 122A prior to handoff of the conversation to assistant module 122B executing at computing device 110B, assistant module 122C may utilize the contextual information associated with the conversation to generate the response by mapping such references in the query to a particular place, location, event, person, movie, tv show, song, and the like that was discussed in the portions of the conversation that took place between the user and assistant module 122A prior to handoff of the conversation to assistant module 122B executing at computing device 110B In response to receiving the indication of the query, assistant module 122C may determine a response to the query (430) and may send an indication of the response back to assistant module 122B executing at computing device 110B, so that assistant module 122B may output the response to the query at UIC 112B (428).

Figure 5:
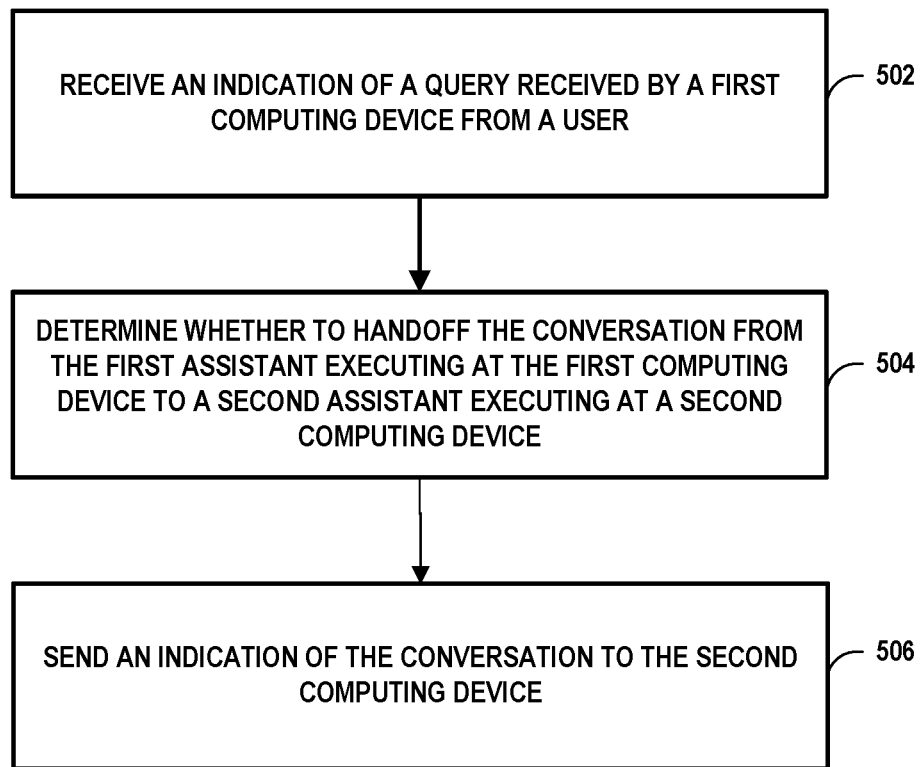
FIG. 5 is a flow diagram illustrating example operations of a computing system for performing a handoff of a conversation between a user and an example virtual assistant, in accordance with one or more techniques of the present disclosure.

FIG. 5 is a flow diagram illustrating example operations of a computing system for performing a handoff of a conversation between a user and an example virtual assistant, in accordance with one or more techniques of the present disclosure. For purposes of illustration only, the example operations of FIG. 5 are described below within the context of FIGS. 1-4.

In the example of FIG. 5, a computing system may receive an indication of a query received by a first computing device 110A from a user, wherein the query forms at least a part of a conversation between the user and a first assistant 122A executing at the first computing device 110A (502). Examples of the computing system may include system 100, digital assistant server 160, and/or computing device 110B. The computing system may determine whether to handoff the conversation from the first assistant 122A executing at the first computing device 110A to a second assistant 122B executing at a second computing device 110B (504). In response to determining to handoff the conversation to the second assistant 122B executing at the second computing device 110B, the computing system may send to the second computing device 110B an indication of the conversation (506).

In some examples, the computing system may determine whether to handoff the conversation from the first assistant 122A executing at the first computing device 110A to the second assistant 122B executing at the second computing device 110B based at least in part on a difference in functional capabilities between the first computing device 110A and the second computing device 110B.

In some examples, determining whether to handoff the conversation from the first assistant 122A executing at the first computing device 110A to the second assistant 122B executing at the second computing device 110B based at least in part on the difference in functional capabilities between the first computing device 110A and the second computing device 110B may further include the computing system determining that a response to the query is to be visually outputted, and in response to determining that the first computing device 110A is not operably coupled to a first display device, and that the second computing device 110B is operably coupled to a second display device, determining to handoff the conversation to the second assistant 122B executing at the second computing device 110B.

In some examples, the computing system may select the second computing device 110B to receive the handoff of the conversation from a plurality of computing devices associated with the user that are available to receive the handoff of the conversation. In some examples, selecting the second computing device 110B to receive the handoff is based at least in part on a physical proximity of the second computing device 110B to the first computing device 110A.

In some examples, the computing system may determine contextual information associated with the conversation between the user and the first assistant 122A executing at the first computing device 110A. The computing system may receive an indication of a second query received by the second computing device 110B from the user, wherein the query comprises a first query. The computing system may determine, based at least in part on the contextual information, that the second query refers back to previous portions of the conversation between the user and the first assistant 122A executing at the first computing device 110A that took place prior to handoff of the conversation to the second assistant 122B executing at the second computing device 110B. The computing system may determine a response to the second query based at least in part on the contextual information associated with the conversation between the user and the first assistant 122A executing at the first computing device 110A.

In some examples, the computing system may receive, from a third party application 172, an indication of whether to handoff the conversation from the first assistant 122A executing at the first computing device 110A to the second assistant 122B executing at a second computing device 110B. The computing system may determine whether to handoff the conversation from the first assistant 122A executing at the first computing device 110A to the second assistant 122B executing at a second computing device 110B based on the indication of whether to handoff the conversation from the first assistant 122A executing at the first computing device 110A to the second assistant 122B executing at a second computing device 110B.

In some examples, the query may include an explicit command to handoff the conversation. In some examples, the computing system may receive the indication of the query from the first computing device 110A. In some examples, the first computing device may receive user input indicative of the query.

The following numbered examples may illustrate one or more aspects of the present disclosure.

Example 1. A method comprising: receiving, by a computing system, an indication of a query received by a first computing device from a user, wherein the query forms at least a part of a conversation between the user and a first assistant executing at the first computing device; determining, by the computing system, whether to handoff the conversation from the first assistant executing at the first computing device to a second assistant executing at a second computing device; and in response to determining to handoff the conversation to the second assistant executing at the second computing device, sending, by the computing system to the second computing device, an indication of the conversation.

Example 2. The method of example 1, wherein determining whether to handoff the conversation from the first assistant executing at the first computing device to the second assistant executing at the second computing device is based at least in part on a difference in functional capabilities between the first computing device and the second computing device.

Example 3. The method of example 2, wherein determining whether to handoff the conversation from the first assistant executing at the first computing device to the second assistant executing at the second computing device based at least in part on the difference in functional capabilities between the first computing device and the second computing device further comprises: determining, by the computing system, that a response to the query is to be visually outputted; and in response to determining that the first computing device is not operably coupled to a first display device, and that the second computing device is operably coupled to a second display device, determining, by the computing system, to handoff the conversation to the second assistant executing at the second computing device Example 4. The method of any of examples 1-3, further comprising: selecting, by the computing system, the second computing device to receive the handoff of the conversation from a plurality of computing devices associated with the user that are available to receive the handoff of the conversation.

Example 5. The method of example 4, wherein selecting the second computing device to receive the handoff is based at least in part on a physical proximity of the second computing device to the first computing device.

Example 6. The method of any of examples 1-5, further comprising: determining, by the computing system, contextual information associated with the conversation between the user and the first assistant executing at the first computing device; receiving, by the computing system, an indication of a second query received by the second computing device from the user, wherein the query comprises a first query; determining, by the computing system and based at least in part on the contextual information, that the second query refers back to previous portions of the conversation between the user and the first assistant executing at the first computing device that took place prior to handoff of the conversation to the second assistant executing at the second computing device; and determining, by the computing system, a response to the second query based at least in part on the contextual information associated with the conversation between the user and the first assistant executing at the first computing device.

Example 7. The method of any of examples 1-6, further comprising: receiving, by the computing system from a third party application, an indication of whether to handoff the conversation from the first assistant executing at the first computing device to the second assistant executing at a second computing device; and determining, by the computing system, whether to handoff the conversation from the first assistant executing at the first computing device to the second assistant executing at a second computing device based on the indication of whether to handoff the conversation from the first assistant executing at the first computing device to the second assistant executing at a second computing device.

Example 8. The method of any of examples 1-7, wherein the query includes an explicit command to handoff the conversation.

Example 9. The method of any of examples 1-8, wherein the computing system receives the indication of the query from the first computing device.

Example 10. The method of example 9, wherein the first computing device receives user input indicative of the query.

Example 11. A system comprising: a first computing device; a second computing device; and a digital assistant system operably connected to the first computing device and the second computing device via a network; wherein the first computing device is operable to: receive user input indicative of a query that forms at least a part of a conversation between the user and a first assistant executing at the first computing device, and send an indication of the query to the digital assistant system; wherein the digital assistant system is operable to: receive the indication of the query from the first computing device, and determine whether to handoff the conversation from the first assistant executing at the first computing device to a second assistant executing at the second computing device, and in response to determining to handoff the conversation to the second assistant executing at the second computing device, send to the second computing device an indication of the conversation; and wherein the second computing device is operable to: receive, from the digital assistant system, the indication of the conversation, and output a response to the query as part of the conversation.

Example 12. The system of claim 11, wherein the digital assistant system is further operable to: determine whether to handoff the conversation from the first assistant executing at the first computing device to the second assistant executing at the second computing device based at least in part on a difference in functional capabilities between the first computing device and the second computing device.

Example 13. The system of example 12, wherein the digital assistant system is further operable to: determine that the response to the query is to be visually outputted; and in response to determining that the first computing device is not operably coupled to a first display device, and that the second computing device is operably coupled to a second display device, determine to handoff the conversation to the second assistant executing at the second computing device.

Example 14. The system of example 12 or 13, wherein the digital assistant system is further operable to: select the second computing device to receive the handoff of the conversation from a plurality of computing devices associated with the user that are available to receive the handoff of the conversation.

Example 15. The system of any of examples 11-14, wherein: the digital assistant system is further operable to determine contextual information associated with the conversation between the user and the first assistant executing at the first computing device; the second computing device is further operable to: receive a second user input indicative of a second query from the user, wherein the user input comprises a first user input, and wherein the query comprises a first query, and send an indication of the second query to the digital assistant system; the digital assistant system is further operable to: determine, based at least in part on the contextual information, that the second query refers back to previous portions of the conversation between the user and the first assistant executing at the first computing device that took place prior to handoff of the conversation to the second assistant executing at the second computing device, determine a second response to the second query based at least in part on the contextual information associated with the conversation between the user and the first assistant executing at the first computing device, wherein the response comprises a first response, and send an indication of the second response to the second query to the second computing device; and the second computing device is further operable to: receive the indication of the second response to the second query from the digital assistant system, and output the second response to the second query.

Example 16. The system of any of examples 11-15, wherein the digital assistant system is further configured to: receive, from a third party application, an indication of whether to handoff the conversation from the first assistant executing at the first computing device to the second assistant executing at a second computing device; and determine whether to handoff the conversation from the first assistant executing at the first computing device to the second assistant executing at a second computing device based on the indication of whether to handoff the conversation from the first assistant executing at the first computing device to the second assistant executing at a second computing device.

Example 17. The system of any of examples 11-16, wherein the digital assistant system is further configured to: receive, from a third party application, an indication of whether to handoff the conversation from the first assistant executing at the first computing device to the second assistant executing at a second computing device; and determine whether to handoff the conversation from the first assistant executing at the first computing device to the second assistant executing at a second computing device based on the indication of whether to handoff the conversation from the first assistant executing at the first computing device to the second assistant executing at a second computing device.

Example 18. The system of any of examples 11-17, wherein the query includes an explicit command to handoff the conversation.

Example 19. A computer-readable storage medium encoded with instructions that, when executed, cause at least one processor of a computing system to: receive an indication of a query received by a first computing device from a user, wherein the query forms at least a part of a conversation between the user and a first assistant executing at the first computing device; determine whether to handoff the conversation from the first assistant executing at the first computing device to a second assistant executing at a second computing device; and in response to determining to handoff the conversation to the second assistant executing at the second computing device, send an indication of the conversation to the second computing device.

Example 20. The computer-readable storage medium of example 19, wherein the instructions, when executed, further cause the at least one processor of the computing system to: determine a form in which to output the response; and select the second computing device to receive the handoff of the conversation from a plurality of computing devices associated with the user that are available to receive the handoff of the conversation and that are capable of outputting the response in the determined form.

Example 21. The method of any combination of examples 1-10.

Example 22. A computing system comprising means for performing the method of any combination of examples 1-10.

Example 23. A computing system comprising at least one processor configured to perform the method of any combination of examples 1-10.

Example 24. A non-transitory computer readable medium comprising instructions that, when executed by at least one processor of a computing system, perform the method of any combination of examples 1-10.

Example 25. A method comprising: receiving, by a second assistant module executing at a second computing device, a request to receive a handoff of a conversation between a user and a first assistant module executing at a first computing device, wherein the request comprises at least an indication of the conversation; and in response to receiving the handoff of the conversation, outputting, by the second computing device, a response in furtherance of the conversation.

Example 26. The method of example 25, wherein the request to receive the handoff of the conversation includes an indication of the response.

Example 27. The method of any of examples 25 and 26, wherein the request to receive the handoff of the conversation comprises an indication of contextual information that is determined from the conversation.

Example 28. The method of any of examples 25-27, further comprising: receiving, by the second computing device, an indication of user input that comprises an indication of a request, wherein the request refers to a portion of the conversation that took place between the user and the first assistant module executing at the first computing device prior to the second computing device receiving the handoff of the conversation; and outputting, by the second computing device, a response to the second request based at least in part on the indication of the contextual information.

Example 29. The method of any combination of examples 25-28.

Example 30. A computing system comprising means for performing the method of any combination of examples 25-28.

Example 31. A computing system comprising at least one processor configured to perform the method of any combination of examples 25-28.

Example 32. A non-transitory computer readable medium comprising instructions that, when executed by at least one processor of a computing system, performs the method of any combination of examples 25-28.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method implemented using one or more processors of a first computing device, the method comprising:
   receiving audio data that captures spoken user input of a user of the first computing device, the audio data being generated via one or more microphones of the first computing device, the spoken user input being directed to an assistant executing at least in part at the first computing device;
   determining, based on processing the spoken user input locally at the first computing device, to provide audible output at an additional computing device that is in communication with the first computing device;
   in response to determining to provide the audible output at the additional computing device that is in communication with the first computing device:
      transmitting ultrasonic communications to at least a second computing device and a third computing device, the second computing device and the third computing device being in communication with the first computing device; and
      based on the ultrasonic communications transmitted to at least the second computing device and the third computing device, determining at least:
         a second physical proximity of the second computing device to the first computing device; and
         a third physical proximity of the third computing device to the first computing device;
      selecting, based on at least the second physical proximity and the third physical proximity, and from among at least the second computing device and the third computing device, the additional computing device; and
      causing the selected additional computing device to provide the audible output in response to receiving the spoken user input.

2. The method of claim 1, wherein selecting the additional computing device from among at least the second computing device and the third computing device comprises:
   selecting the second computing device as the additional computing device based on the second physical proximity of the second computing device to the first computing device and the third physical proximity of the third computing device to the first computing device indicating the second computing device is more physically proximate to the first computing device than the third computing device.

3. The method of claim 1, wherein selecting the additional computing device from among at least the second computing device and the third computing device is further based on a second current status of the second computing device and a third current status of the third computing device.

4. The method of claim 3, wherein the second current status of the second computing device indicates whether the second computing device is in a powered on state, and wherein the third current status of the third computing device indicates whether the third computing device is in a powered on state.

5. The method of claim 3, wherein the second current status of the second computing device indicates whether the second computing device is capable of providing the audible output, and wherein the third current status of the third computing device indicates whether the third computing device is capable of providing the audible output.

6. The method of claim 3, wherein the second current status of the second computing device indicates whether the second computing device is authorized to provide the audible output, and wherein the third current status of the third computing device indicates whether the third computing device is authorized to provide the audible output.

7. The method of claim 1, further comprising, in response to determining to provide the audible output at the additional computing device that is in communication:
   transmitting the ultrasonic communications to a fourth computing device; and
   based on the ultrasonic communications transmitted to the fourth computing device, determining a fourth physical proximity of the fourth computing device to the first computing device; and
   wherein selecting the additional computing device is further based on the fourth physical proximity, and is from among at least the second computing device, the third computing device, and the fourth computing device.

8. The method of claim 1, wherein the second computing device comprises an audio output device that is capable of providing the audible output in response to receiving the spoken user input, and wherein the third computing device comprises an additional audio output device, that is in addition to the audio output device, that is also capable of providing the audible output in response to receiving the spoken user input.

9. The method of claim 1, wherein determining to provide the audible output at the additional computing device that is in communication with the first computing device based on processing the spoken user input locally at the first computing device comprises:
  processing the spoken user input locally at the first computing device to determine the spoken user input includes an explicit user command to provide the audible output at the additional computing device.

10. The method of claim 9, wherein the explicit user command to provide the audible output at the additional computing device does not explicitly identify the second computing device or the third computing device.

11. A first computing device, the first computing device comprising:
  one or more first computing device microphones;
  at least one first computing device processor; and
  first computing device memory storing first computing device instructions that, when executed, cause the at least one first computing device processor to:
    receive audio data that captures spoken user input of a user of the first computing device, the audio data being generated via one or more of the microphones of the first computing device, the spoken user input being directed to an assistant executing at least in part at the first computing device;
    determine, based on processing the spoken user input locally at the first computing device, to provide audible output at an additional computing device that is in communication with the first computing device;
    in response to determining to provide the audible output at the additional computing device that is in communication with the first computing device:
      transmit ultrasonic communications to at least a second computing device and a third computing device; and
      based on the ultrasonic communications transmitted to at least the second computing device and the third computing device, determine at least:
        a second physical proximity of the second computing device to the first computing device; and
        a third physical proximity of the third computing device to the first computing device;
      select, based on at least the second physical proximity and the third physical proximity, and from among at least the second computing device and the third computing device, the additional computing device; and
      cause the selected additional computing device to provide the audible output in response to receiving the spoken user input.

12. The first computing device of claim 11, wherein the first computing device instructions to select the additional computing device from among at least the second computing device and the third computing device comprise first computing device instructions to:
  select the second computing device as the additional computing device based on the second physical proximity of the second computing device to the first computing device and the third physical proximity of the third computing device to the first computing device indicating the second computing device is more physically proximate to the first computing device than the third computing device.

13. The first computing device of claim 11, wherein selecting the additional computing device from among at least the second computing device and the third computing device is further based on a second current status of the second computing device and a third current status of the third computing device.

14. The first computing device of claim 11, wherein the second computing device comprises an audio output device that is capable of providing the audible output in response to receiving the spoken user input, and wherein the third computing device comprises an additional audio output device, that is in addition to the audio output device, that is also capable of providing the audible output in response to receiving the spoken user input.

15. The first computing device of claim 11, wherein the first computing device instructions to determine to provide the audible output at the additional computing device that is in communication with the first computing device based on processing the spoken user input locally at the first computing device comprise first computing device instructions to:
  process the spoken user input locally at the first computing device to determine the spoken user input includes an explicit user command to provide the audible output at the additional computing device.

16. The first computing device of claim 15, wherein the explicit user command to provide the audible output at the additional computing device does not explicitly identify the second computing device or the third computing device.

17. A system of computing devices, the system of computing devices comprising:
  at least a first computing device, a second computing device, and a third computing device; and
  the first computing device comprising:
    at least one first computing device processor; and
    first computing device memory storing first computing device instructions that, when executed, cause the at least one first computing device processor to:
      receive audio data that captures spoken user input of a user of the first computing device, the audio data being generated via one or more of the microphones of the first computing device, the spoken user input being directed to an assistant executing at least in part at the first computing device;
      determine, based on processing the spoken user input locally at the first computing device, to provide audible output at an additional computing device that is in communication with the first computing device;
      in response to determining to provide the audible output at the additional computing device that is in communication with the first computing device:
        transmit ultrasonic communications to at least a second computing device and a third computing device; and
        based on the ultrasonic communications transmitted to at least the second computing device and the third computing device,
      determine at least:
        a second physical proximity of the second computing device to the first computing device; and
        a third physical proximity of the third computing device to the first computing device;
      select, based on at least the second physical proximity and the third physical proximity, and from among at least the second computing device and the third computing device, the additional computing device; and
      cause the selected additional computing device to provide the audible output in response to receiving the spoken user input.

18. The system of computing devices of claim 17,
the second computing device comprising:
  at least one second computing device processor; and
  second computing device memory storing second computing device instructions that, when executed, cause the at least one second computing device processor to:
    receive the ultrasonic communications from the first computing device;
    generate the second physical proximity of the second computing device to the first computing device; and
    transmit the second physical proximity to the first computing device; and
the third computing device comprising:
  at least one third computing device processor; and
  third computing device memory storing third computing device instructions that, when executed, cause the at least one third computing device processor to:
    receive the ultrasonic communications from the first computing device;
    generate the third physical proximity of the third computing device to the first computing device; and
    transmit the third physical proximity to the first computing device.

19. The system of computing devices of claim 17, further comprising:
  a fourth computing device;
  wherein, in response to determining to provide the audible output at the additional computing device that is in communication with the first computing device, the first computing device instructions further cause the at least one first computing device processor to:
    transmit the ultrasonic communications to the fourth computing device, the fourth computing device being in communication with the first computing device; and
    based on the ultrasonic communications transmitted to the fourth computing device, determine a fourth physical proximity of the fourth computing device to the first computing device; and
  wherein selecting the additional computing device is further based on the fourth physical proximity, and is from among the second computing device, the third computing device, and the fourth computing device.

20. The system of computing devices of claim 17, wherein the second computing device comprises an audio output device that is capable of providing the audible output in response to receiving the spoken user input, and wherein the third computing device comprises an additional audio output device, that is in addition to the audio output device, that is also capable of providing the audible output in response to receiving the spoken user input.

* * * * *